United States Patent [19]
Yamada et al.

[11] Patent Number: 5,446,712
[45] Date of Patent: Aug. 29, 1995

[54] OPTICAL SYSTEM HAVING A PRECISION ANGULAR DISPLACEMENT MECHANISM INCLUDING A FLAT METAL SPRING

[75] Inventors: Tadashi Yamada; Hiroyuki Ishikawa, both of Suwa, Japan

[73] Assignee: Seiko Epson Corporation, Tokyo, Japan

[21] Appl. No.: 949,818

[22] PCT Filed: Apr. 20, 1992

[86] PCT No.: PCT/JP92/00505
 § 371 Date: Feb. 22, 1993
 § 102(e) Date: Feb. 22, 1993

[30] Foreign Application Priority Data

Apr. 22, 1991 [JP] Japan ................. 3-090267
Sep. 17, 1991 [JP] Japan ................. 3-236343
Dec. 11, 1991 [JP] Japan ................. 3-327361

[51] Int. Cl.⁶ .................................... G11B 7/095
[52] U.S. Cl. .......................... 369/44.16; 369/112
[58] Field of Search .................. 369/44.14–44.16, 369/44.32, 54, 112

[56] References Cited

U.S. PATENT DOCUMENTS

| | | | |
|---|---|---|---|
| 4,719,614 | 1/1988 | Leterme et al. | 369/44.14 X |
| 4,768,180 | 8/1988 | Janssen et al. | 369/44.32 |
| 4,773,055 | 9/1988 | Gijzen et al. | 369/44.32 X |
| 4,799,206 | 1/1989 | Imanaka | 369/44.32 X |
| 5,117,410 | 5/1992 | Akiyama | 369/44.32 X |

FOREIGN PATENT DOCUMENTS

| | | |
|---|---|---|
| 58-168030 | 10/1983 | Japan . |
| 59-165252 | 9/1984 | Japan . |
| 61-126527 | 6/1986 | Japan ............. 369/44.15 |
| 61-177651 | 8/1986 | Japan . |
| 62-210418 | 9/1987 | Japan . |
| 2-206032 | 8/1990 | Japan ............. 369/44.15 |

OTHER PUBLICATIONS

International Symposium on Optical Memory 1991, "Development of the Actuators for Small-Size Magneto-Optical Disk Drives", Junichi Ichihara et al., Fujitsu Lab., pp. 67–68.

Japan Mechanical Convention Papers, 1991-2, vol. 57, No. 534, "Tracking Actuators for High-Speed Magneto Optical Disk Drives", Junichi Ichihara et al., pp. 167–173.

*Primary Examiner*—W. H. Young
*Attorney, Agent, or Firm*—Harold T. Tsiang

[57] ABSTRACT

In the precision angular displacement mechanism of an optical record and playback apparatus, the elasticity coefficient of the supporting component is kept from fluctuating caused by changes in temperature and the fatigue strength is increased. This is accomplished by making the support component of the moving section a flat metal spring. The support component of the moving section is attached with a reflecting mirror. In addition, by forming the moving section so that the position of its gravity center is located near the center of the flat metal spring, it is possible to prevent secondary resonance and torque resonance. Finally, an assembly method is disclosed that makes such a precision angular displacement mechanism easy to assemble.

15 Claims, 16 Drawing Sheets

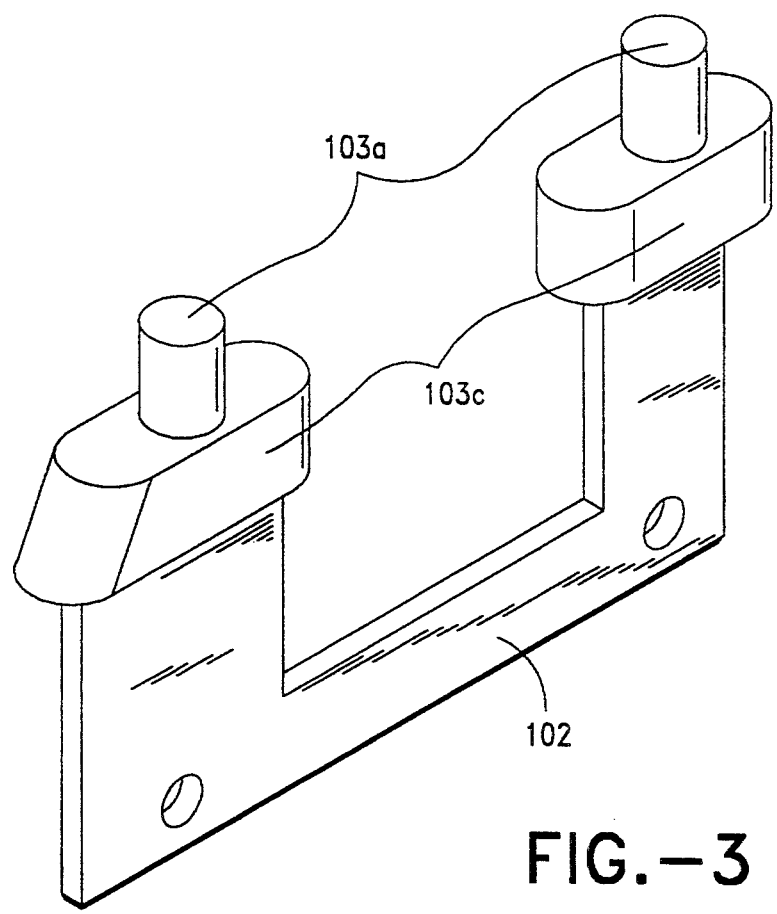
FIG.−3
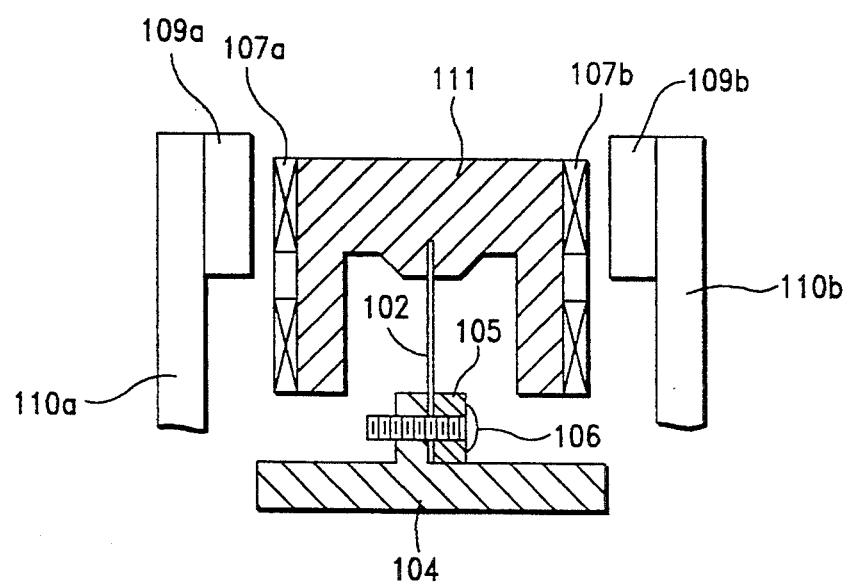
FIG.−4

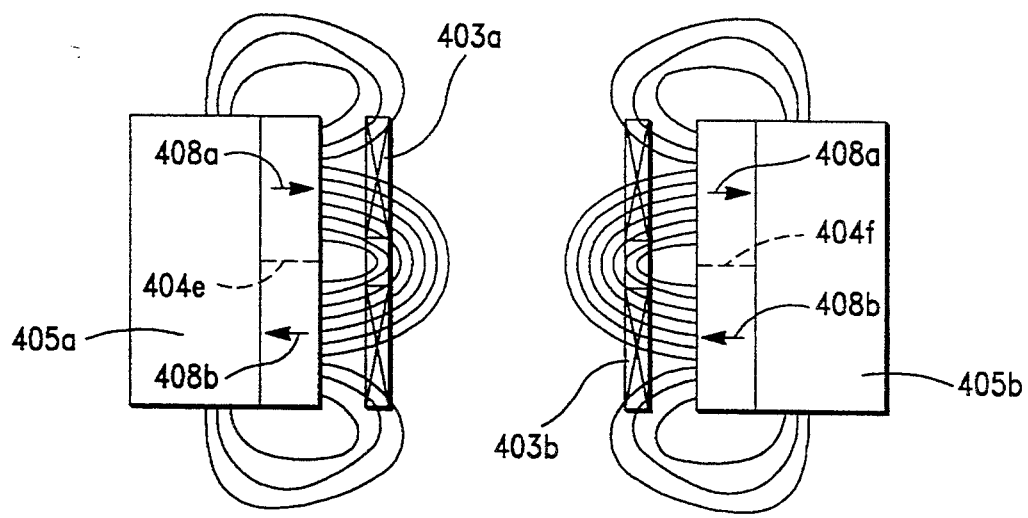
FIG.—16
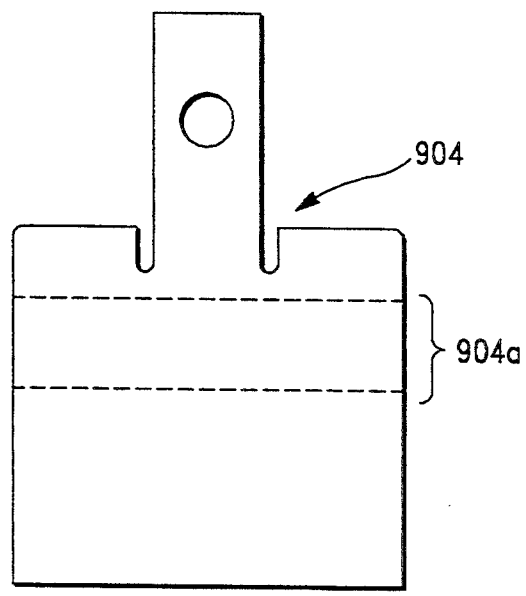
FIG.—21

OPTICAL SYSTEM HAVING A PRECISION ANGULAR DISPLACEMENT MECHANISM INCLUDING A FLAT METAL SPRING

BACKGROUND OF THE INVENTION

This invention relates to a precision angular displacement mechanism that carries out tracking for an optical record and playback apparatus using a separate optical system and the method of assembling that mechanism.

As shown in FIG. 22, in order to increase the access speed of the optical record and playback apparatus of the prior art, it is common to divide the optical system into a shifting optical system 2 that moves in the radial direction of an optical disk 1 and a stationary optical system (not illustrated) that has a light source. Here, shifting optical system 2 is composed of an object lens 3 and a mirror 4. The stationary optical system is composed of a light source and an angular displacement mechanism called a galvanomirror which does not move in relation to optical disk 1.

The galvanomirror has a reflecting mirror 6 which reflects a laser light 5 emitted from the light source in a direction A to a direction B and minutely displaces reflecting mirror 6 around a direction E. The galvanomirror also has a mechanism that tilts laser light 5 a minute angle ($\theta°$) in direction B. As a result, laser light 5 is reflected in direction B at reflecting mirror 6. Laser light 5 is then reflected in a direction D at a mirror 4 of shifting optical system 2 and is guided to object lens 3. In addition, reflecting mirror 6 is minutely displaced in direction E. By tilting laser light 5 at a minute angle in direction B, a light spot 8 is always placed on a track 7 on optical disk 1 for tracking purposes.

An example of the galvanomirror of the prior art appears in FIGS. 23 through 26. As shown in these drawings, coils 10a and 10b, which have elliptical windings, are each attached to one side of a holder 9 having a concave cross section shape. A triangular column-shaped reflecting mirror 6 is attached to the cut-out portion of the tapered part of holder 9 by an adhesive. The tip of a holder support component 11, which is made of resin or synthetic rubber and supports holder 9, is an insert molded on the inner side of holder 9. The base end of holder support component 11 is attached to a support unit 12. In the middle of holder support component 11 is a thin hinge 11a that can change its shape elastically.

On the two sides of holder 9 is a magnetic circuit which is composed of magnets 13a and 13b and yokes 14a and 14b. There is an air gap between the magnetic circuit and coils 10a and 10b. Magnets 13a and 13b run along the longitudinal direction of coils 10a and 10b. As shown in FIG. 26, the direction of all magnification is in the same direction. As a result, the magnetic field generated by magnets 13a and 13b interlinks with coils 10a and 10b. In FIG. 26, the direction of that magnetic field is to the right. Because coils 10a and 10b are connected, the current flows in the opposite direction. When current flows through coils 10a and 10b, it follows the Fleming left hand rule. As shown in FIG. 26, a magnetic force is generated in each of coils 10a and 10b. The magnetic forces are in the opposite directions to each other.

As a result, when current flows through coils 10a and 10b, the magnetic force that acts in the opposite direction in coils 10a and 10b functions as the moment that moves the moving section, which is composed of reflecting mirror 6, holder 9 and coils 10a and 10b, around thin hinge 11a. By adjusting the direction and magnitude of the moment, it is possible to make minute adjustments to reflecting mirror 6 to adjust the direction in which the laser light will be reflected relative to shifting optical system 2.

However, in the galvanomirror described above, because thin hinge 11a of holder support component 11 is made of resin or synthetic rubber, the rate of elasticity changes with temperature. As a result, the resonant frequency fluctuates, reducing the control characteristics of reflecting mirror 6. In particular, when coils 10a and 10b are heated up due to continuous current flow, heat is conducted to holder support component 11, the elasticity coefficient of thin hinge 11a decreases and the resonant frequency fluctuates.

In the galvanomirror described above, because the moving section can be rotated by changing elasticity of thin hinge 11a, repetitive stress acts on thin hinge 11a. In particular, at low temperatures, fatigue breakdown occurs. Further, thin hinge 11a, which is made of resin or synthetic rubber, is commonly manufactured by means of injection molding. Therefore, there are variations in the elasticity coefficient of the thin hinge section due to variations in its dimensions caused by variations in the molding conditions and the wear to the mold caused over time, etc. As a result, strict manufacturing control is required.

Moreover, in the galvanomirror described above, under a condition in which no current flows through coils 10a and 10b, the moving section, which includes reflecting mirror 6, should be at its center position. In fact, however, an offset is generated and the moving section tilts toward one side or the other. As a result, the relative positions of coils 10a and 10b and magnets 13a and 13b are also offset. This results in reflecting mirror 6 not being able to achieve its designated angular displacement when the current is flowing through the coils 10a and 10b. Light spot 8 on track 7 of optical disk 1 gets into an offset condition in which it is not accurately positioned on track 7. The cause of the galvanomirror offset is due to the moving section being freely supported by support component 11 of the holder or by the creeping of thin hinge 11a. However, the greatest cause is due to a major fluctuation in the elasticity coefficient of thin hinge 11a due to its temperature characteristics.

Furthermore, as shown in FIG. 26, in the galvanomirror described above, the magnetic field generated by the magnetic circuitry, which is composed of magnets 13a and 13b and yokes 14a and 14b, only interlinks to one of the two effective portions of coils 10a and 10b. This creates problems of poor moment generation efficiency and poor balance. In other words, on coils 10a and 10b, which have elliptical windings, the effective portions are the two upper and lower linear portions that run in the longitudinal direction. However, magnets 13a and 13b correspond to only one of these coils. Therefore, these magnetic fields do not interlink to the other linear section. As a result, because the electromagnetic force that is generated in the effective portions of magnets 13a and 13b and interlinks coils 10a and 10b is not symmetrical to thin hinge 11a, which is at the rotation center of the moving section, the force not only functions as the moment centering on thin hinge 11a, but also acts as a force that causes translational motion.

This invention solves the above problems. By forming the holder support component of a flat metal spring, and by using the elastic deformation of the the flat metal spring to support the holder, to which the reflecting mirror is attached, the fluctuations in the elasticity coefficient of the holder support component caused by the ambient temperature can be controlled. Further, holder support component with a high fatigue strength can be offered. At the same time, the objective of this invention is to offer a method of assembling the holder and the flat metal spring by combining the synthetic resin with the flat metal spring as a single unit using insert molding.

Other objectives of this invention are to increase the generation efficiency of the magnetic force that is generated in the coils, to improve the balance of the force that moves the moving section, to reduce the force that contributes to the translational motion of the moving section, and to offer an optical record and playback apparatus that improves the performance of rotational motion.

SUMMARY OF THE INVENTION

The the precision angular displacement mechanism of the optical record and playback apparatus of this invention that accomplishes the above objectives comprises a shifting optical system that moves in the radial direction of an optical disk, and a seperate stationary optical system where the light source is located. The precision angular displacement mechanism reflects the laser light emitted from the light source by a reflecting mirror. A light spot is formed on the track of the optical disk by angularly displacing of the reflecting mirror. The reflecting mirror is located in a moving section supported at the tip end of a flat metal spring. The base end of the flat metal spring is attached to attaching means. Actuator means minutely tilts the moving section.

Here, it is desirable to have the location of the gravity center of the moving section nearly match the location of the center of the metal spring, which can change shape elastically. In addition, it is also desirable for the drive center line of the actuator means to be parallel to the principal axis of inertia of the moving section. Further, if the section of the flat metal spring that changes shape elastically is nearly square in shape, the alignment of the position of the gravity center and the position of the drive center will be simple.

The moving section has a holder that holds the reflecting mirror. After inserting the resin projection formed as a single unit on the tip end of the flat metal spring, it is welded or cut. To insert further, the projection may be pulled up to assemble it. The tip end of the flat metal spring also may be an insert molded to the holder.

Finally, the flat metal spring may be an insert molded to the attaching means, or it may be attached to the attaching means by welding.

Here, in addition to the moving section having coils on each side of the holder, the actuator means is composed of a magnetic circuitry including two magnets attached to yokes each located at an air gap from the coils. The two magnets are located symmetrically relative to the center of the coils. It is possible to wire the two coils together in order to create a rotating moment that rotates the moving section by the magnetic force generated in each coil when current flows through them.

In such a case, the yoke may have a concave section and the magnet may be glued to the concave section. Or, instead of the two magnets, a single magnet which has opposing polarities may be glued to the yokes.

In addition to attaching the reflecting mirror to the holder, it is possible to provide a tilt sensor composed of a light source and a reflected light volume detector at a location opposite to the reflecting mirror, attach a positioning dowel to the yoke and use the positioning dowel to position the magnet to the position of the yoke, and create a stopper as a single unit on the holder.

In this invention, it is possible to minimize the fluctuations in the resonant frequency caused by fluctuations in temperature by supporting the holder with flat metal spring. This allows an improvement in the stability when controlling the galvanomirror through servo. In addition, it is possible to improve the durability and reliability of the galvanomirror by providing holder supporting materials with increased fatigue strength. Stable shape dimensions can be obtained by manufacturing the flat metal spring by means such as etching or pressing, thereby preventing the fluctuations in the elasticity coefficient of the holder support component caused by the variations in dimensions during manufacturing. Also, stable driving in a broad frequency region can be achieved because it is possible to completely eliminate harmful resonance caused by secondary resonance or torque resonance, etc., since the gravity center of the moving section nearly matches the center position of the flat metal spring and the drive center lines are nearly parallel to the principal axis of inertia of the moving section.

As a result, there is a remarkable improvement in the tracking control performance of the optical record and playback apparatus that uses the precision angular displacement mechanism of this invention. Because of the single unit molding of synthetic resin to the flat metal spring, it is possible to form components that connect to the holder. Alternatively, by insert molding the flat metal spring to the holder, the connection between the holder and the flat metal spring is simplified. It is also possible to improve the assembly performance as well as to reduce the number of parts. In addition, by using the coils effectively in this invention, the moving section can be reduced in size, thus reducing the size of the precision angular displacement mechanism. As a result, energy savings is also achieved. This results in a sharp increase in the rotational motion performance of the moving section to generate a well balanced electromagnetic force. Moreover, by providing a tilt sensor, it is possible to prevent the offset that occurs during assembly and avoid the impact between the coils and the magnets when a stopper is provided on the holder.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 shows an angular view of the flat metal spring in the first embodiment of this invention.

FIG. 4 shows a cross section of a variation of the first embodiment of this invention.

FIG. 16 shows the details of the magnetic circuitry of the seventh embodiment of this invention.

FIG. 21 depicts the flat metal spring in FIG. 17.

DESCRIPTION OF THE PREFERRED EMBODIMENTS

Figure 1:
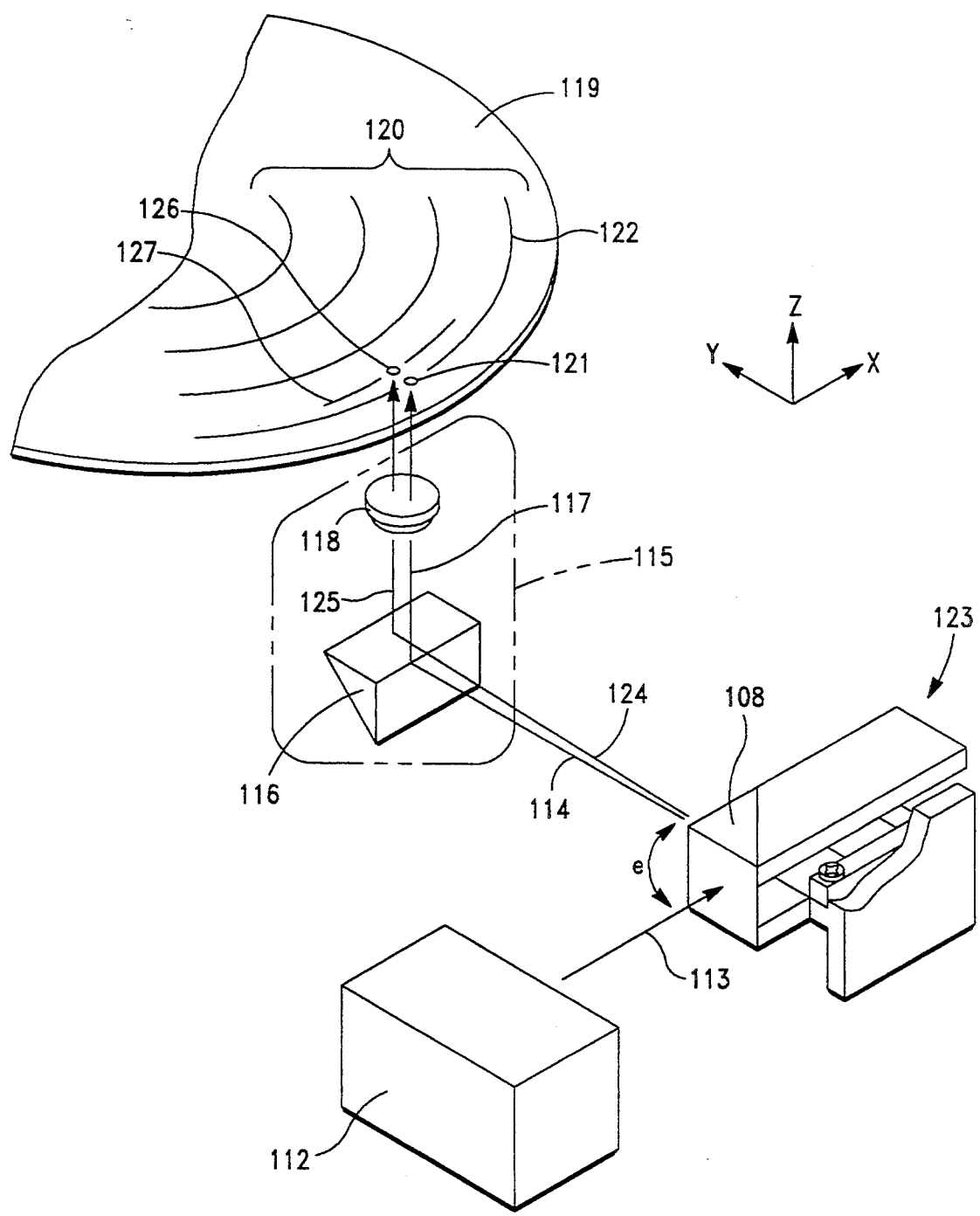
FIG. 1 shows an angular view of the optical record and playback apparatus that uses the galvanomirror in the first embodiment of this invention.
Figure 2A:
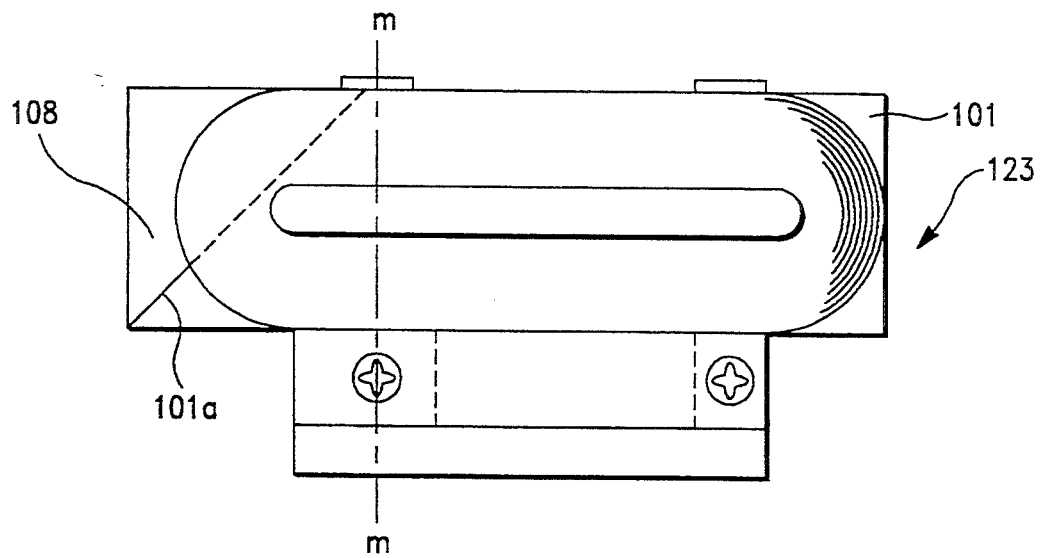
FIG. 2A shows a side view of the galvanomirror associated with the first embodiment of this invention.
Figure 2B:
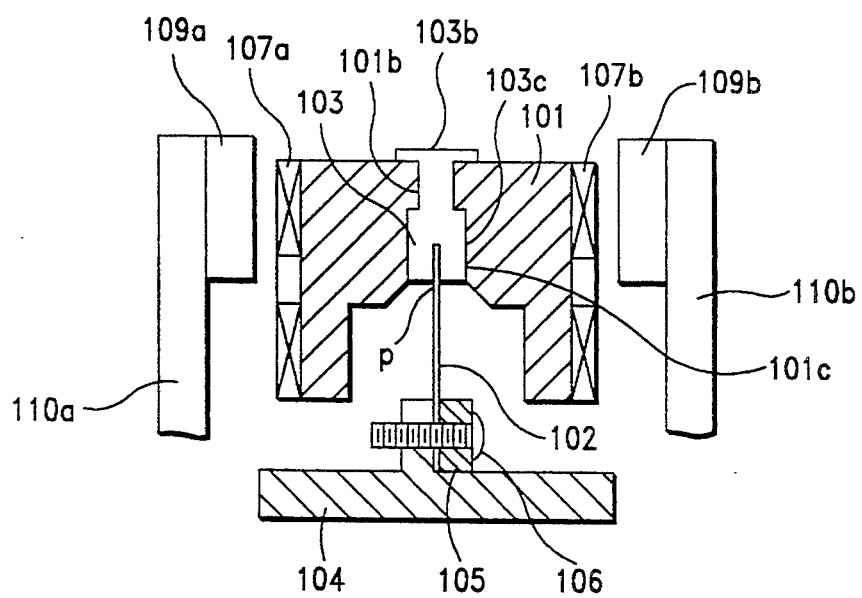
FIG. 2B shows a cross section of the area represented by line m—m of FIG. 2A.

FIGS. 1-3 show the first embodiment of this invention. FIG. 1 is an optical record and playback apparatus that is equipped with the precision angular displacement mechanism of this embodiment. FIG. 2A is a side view of the galvanomirror associated with this embodiment. FIG. 2B is a cross sectional view of line m—m in FIG. 2A. FIG. 3 is an angular view of the flat metal spring in the galvanomirror.

In the optical record and playback apparatus shown in FIG. 1, a shifting optical system 115 that moves in the radial direction of an optical disk 119 is separated from a stationary optical system which is in a position where it does not move in relation to optical disk 119. Shifting optical system 115 has an object lens 118 and a mirror 116. The stationary optical system includes a light source 112 containing components such as a semiconductor laser, and a galvanomirror 123.

Galvanomirror 123 includes a reflecting mirror 108 which reflects a laser light 113 emitted from light source 112 to shifting optical system 115 as a laser light 114. Galvanomirror 123 is equipped with a mechanism that can tilt laser light 114 a minute angle in order to carry out precision displacement of reflecting mirror 108 in a direction e. As shown in FIGS. 2A and 2B, a triangular column-shaped reflecting mirror 108 is attached by adhesion to a tapered cut-out portion 101a on one end of holder 101. Holder 101 is made of a light weight metal and has a concave cross section. Coils 107a and 107b are each attached to one side of holder 101 through an electrically insulated material.

Holder 101 is supported by a flat metal spring 102. Synthetic resin terminals 103 including projections 103a are formed as a single unit on the tip ends of flat metal spring 102. Holder 101 has holes 101b into which terminals 103 are inserted. Sections 103b are formed by welding the portions of projections 103a that are guided outside of holes 101b. In order to prevent projections 103a from being pulled away from holes 101b, holder 101 and flat metal spring 102 are bonded together.

Since a first surface 103c of terminal 103 and a second surface 101c of holder 101 are sealed tightly, holder 101 and flat metal spring 102 cannot move around relative to each other. The base end of flat metal spring 102 is tightened down by a support base 104, a locking plate 105 and a screw 106 as a unit. Flat metal spring 102 is supported between support base 104 and locking plate 105.

Yokes 110a and 110b are placed on one side of coils 107a and 107b, respectively. Magnets 109a and 109b are attached to yokes 110a and 110b, respectively, at an appropriate gap away from the respective coils.

FIG. 4 shows a cross section of a variation of this embodiment. In this embodiment, flat metal spring 102 is an insert molded to a holder 111, which is made of synthetic resin. The remainder of the configuration is the same as the embodiment shown in FIGS. 2A and 2B.

In the galvanomirror described above, the magnetic circuitry formed by yokes 110a and 110b and magnets 109a and 109b creates a magnetic field. When current flows through coils 107a and 107b, an electromagnetic force is generated in these coils as a result of the Fleming left hand rule. This electromagnetic force functions as the moment that moves the moving section, which is composed of holder 101, reflecting mirror 108 and coils 107a and 107b, around point p of flat metal spring 102. As a result of the elastic deformation of flat metal spring 102 by this moment, holder 101 along with reflecting mirror 108 rotates around point p as the center.

Thus, as shown in FIG. 1, laser light 113 emitted in direction x from light source 112 enters reflecting mirror 108, then changes its angle and is reflected as laser light 114 in direction y. Laser light 114 changes its angle at mirror 116 of shifting optical system 115 and is reflected as laser light 117 in direction z. Laser light 114 is then converged by object lens 118 to form an optical record and playback spot 121 on a track region 120 of optical disk 119. Thus the recording and playback of information takes place.

A plurality of tracks 122 in track region 120 are for forming optical record and playback spot 121. When data is recorded and played back, reflecting mirror 108 is minutely angularly displaced in direction e to minutely displace laser light 114. Thus, tracking takes place in a manner that always forms a light spot 121 on a particular track 122.

In order to access the target track in track region 120, it is common to conduct a seek operation by moving shifting optical system 115 in direction y. However, when the interval between the tracks is relatively small, rather than moving the shifting optical system in direction y, sometimes it shortens the seeking time to drive galvanomirror 123 and minutely angularly displace reflecting mirror 108. In addition, because shifting optical system 115 has a relatively large mass, there is a short frequency band in which responses are possible. If there is a high frequency disturbance during the positioning of the target track, tracking will no longer be possible in some cases.

In other words, when there is a desire to track in a short span of time and the interval between the tracks is relatively small, or when there is a desire to minimize high frequency disturbances, it is more convenient to carry out seeking using galvanomirror 123 described above. More specifically, by rotating reflecting mirror 108 to another angle in direction e, a laser light 124 is reflected in direction y. Laser light 124 changes its angle at mirror 116 of shifting optical system 115 and is then reflected as laser light 125 in direction z. Laser light 125 is converged by object lens 118 and a light spot 126 is formed on track region 120. Light spot 126 is formed on a track different from the one on which light spot 121 is located.

By driving galvanomirror 123 in this manner to control the reflecting direction of laser light 113 the recording and playback of information can be carried out by controlling the positioning of the laser light on the target track in track region 120.

In this embodiment, flat metal spring 102 has extremely low variations in the elasticity coefficient caused by temperature fluctuations as compared to the resins or synthetic rubber used in the prior art. As a result, there is no resonance frequency fluctuation and the controlling of reflecting mirror 108 is more reliable. In particular, even if coils 107a and 107b are heated due to continuous current flow, the elasticity coefficient of flat metal spring 102 will not decrease to result in fluctuation in the resonant frequency. Moreover, flat metal spring 102 is strong in repeated bending at low temperatures, thus maintaining its initial characteristics over a long period of time.

Because flat metal spring 102 has only slight variations in the elasticity coefficient, the amount of offset in galvanomirror 123 is reduced to a fraction, resulting in improving the accuracy of the tracking.

As shown in FIGS. 2A and 2B, projections 103 formed on the tip ends of flat metal spring 102 may be inserted into and welded in the holes in holder 101. Alternatively, the tip ends may be inserts molded to holder 101, as shown in FIG. 4.

In the embodiment described above, the magnetic circuitry is used as the actuator means to make the minute angular tilts of the moving section. However, this embodiment is not limited to the above.

Figure 5:
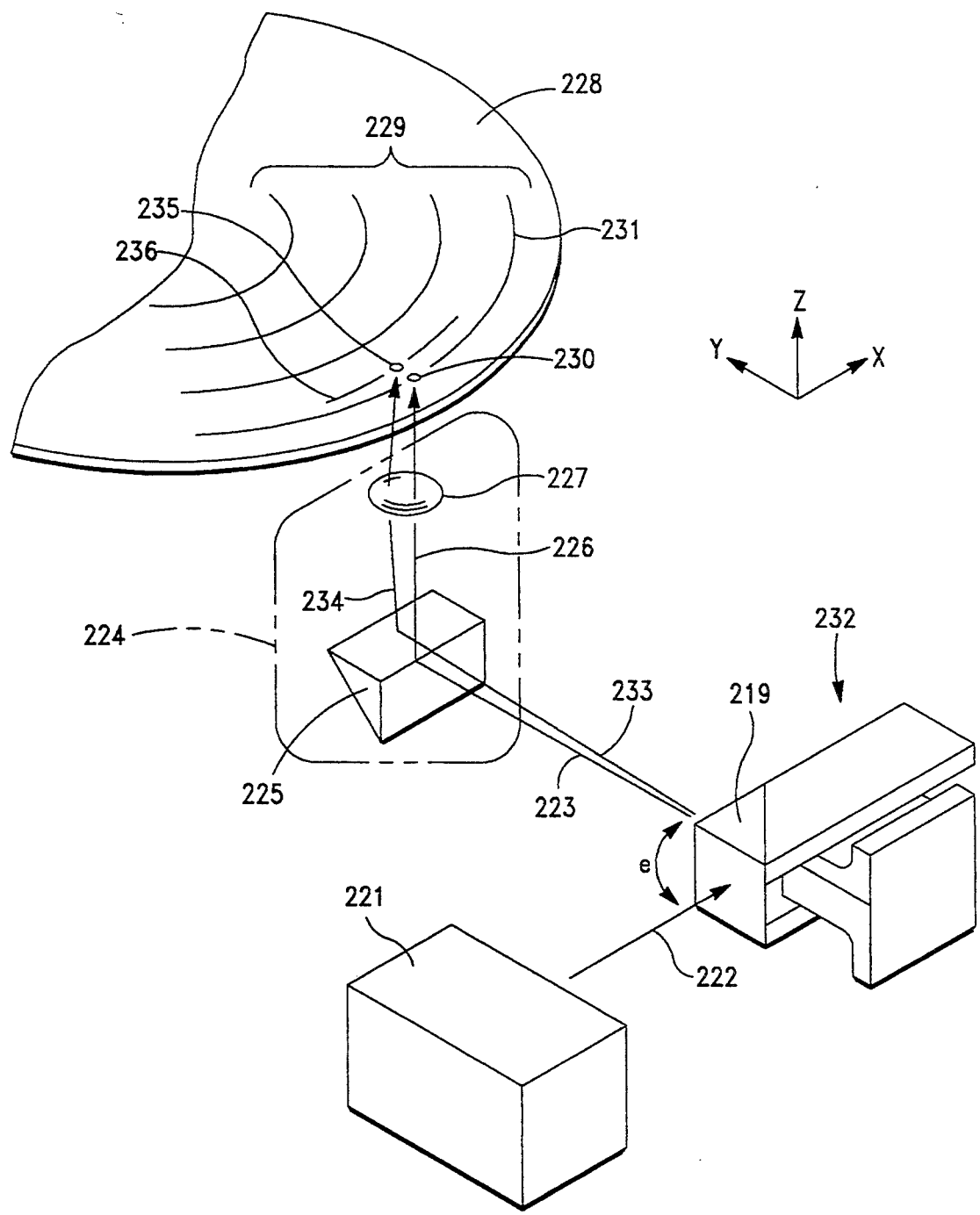
FIG. 5 shows an angular view of the optical record and playback apparatus that uses the galvanomirror in the second embodiment of this invention.
Figure 6:
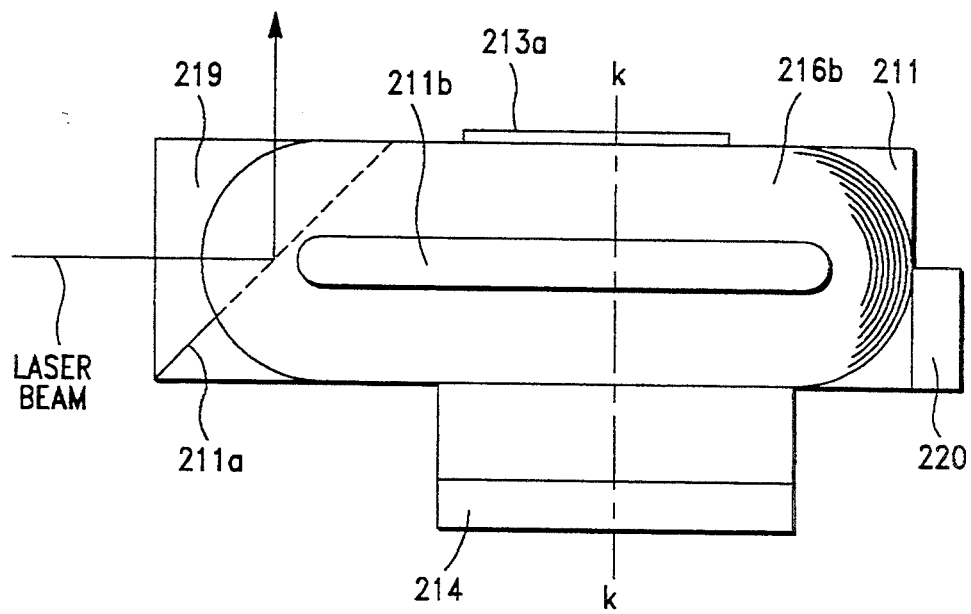
FIG. 6 shows a side view of the galvanomirror associated with the second embodiment of this invention.
Figure 7:
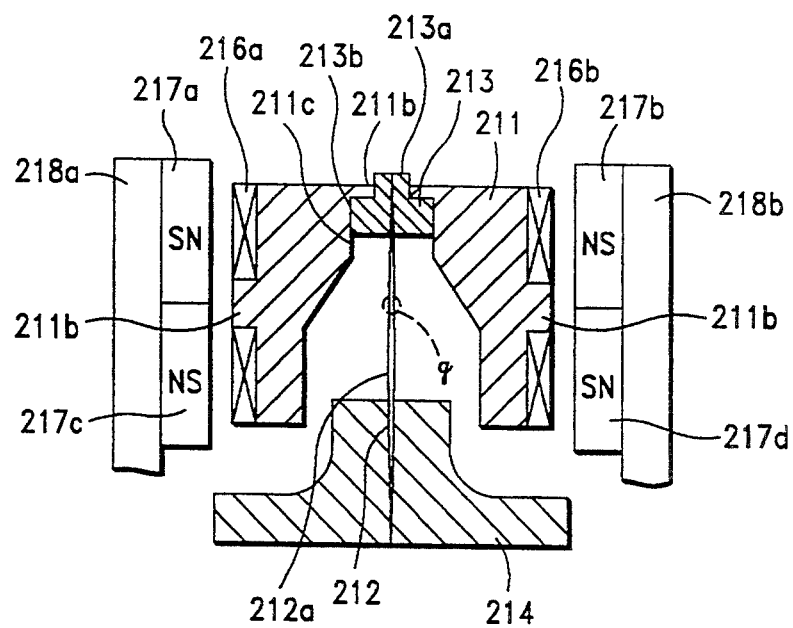
FIG. 7 shows the cross section represented by line k—k in FIG. 6.

The second embodiment of this invention will be described in conjunction with FIGS. 5-7. FIG. 5 shows an angular view of the optical record and playback apparatus of the second embodiment. FIG. 6 shows a side view of the galvanomirror of this embodiment. FIG. 7 shows a cross section represented by line k—k in FIG. 6.

In the optical record and playback apparatus shown in FIG. 5, a shifting optical system 224, which moves in the radial direction of an optical disk 228, and a stationary optical system, which is in a position where it does not move relative to optical disk 228, are separated. Shifting optical system 224 includes an object lens 227 and a mirror 225. The stationary optical system is composed of a galvanomirror 232 and a light source 221 made from a semiconductor laser, etc.

Galvanomirror 232 includes a reflecting mirror 219 which reflects a laser light 222 emitted from light source 221 to shifting optical system 224 as a laser light 223. Galvanomirror 232 also includes a mechanism that can make precise angular displacements of reflecting mirror 219 in direction e for making precise angular tilts of laser light 223. As shown in FIGS. 6 and 7, a triangular column reflecting mirror is attached by an adhesive to a tapered cut-out 211a on one end of a holder 211. Holder 211 is made of a light metal and has a concave cross sectional shape. A balancer 220 for balancing weight is attached to holder 211 on the other side opposite to reflecting mirror 219. In addition, on each side of holder 211 protrudes a rib 211b. Coils 216a and 216b, which are made of flat wires, are each positioned and attached to respective ribs 211b through electrically insulated material (not illustrated).

Holder 211 is supported by a flat metal spring 212. A synthetic resin terminal 213 and a support base 214 are formed as a single unit on the tip end and base end, respectively, of flat metal spring 212. The section between terminal 213 and support base 214 forms an elastic deformation section 212a that can elastically change its shape when holder 211 rotates. A projection 213a on terminal 213 is inserted in a hole 211b in holder 211. Thus, the relative positions of terminal 213 and holder 211 are determined by inserting projecting part 213a of terminal 213 into hole 211b of holder 211. A side surface 213b of terminal 213 and a surface 211c of holder 211 are firmly bonded together using an adhesive. The moving section, which is composed of holder 211, coils 216a and 216b, reflecting mirror 219, terminal 213 and balancer 220, has its weight distributed so that the position of the gravity center is about at a center point q of elastic deformation section 212a.

Figure 8:
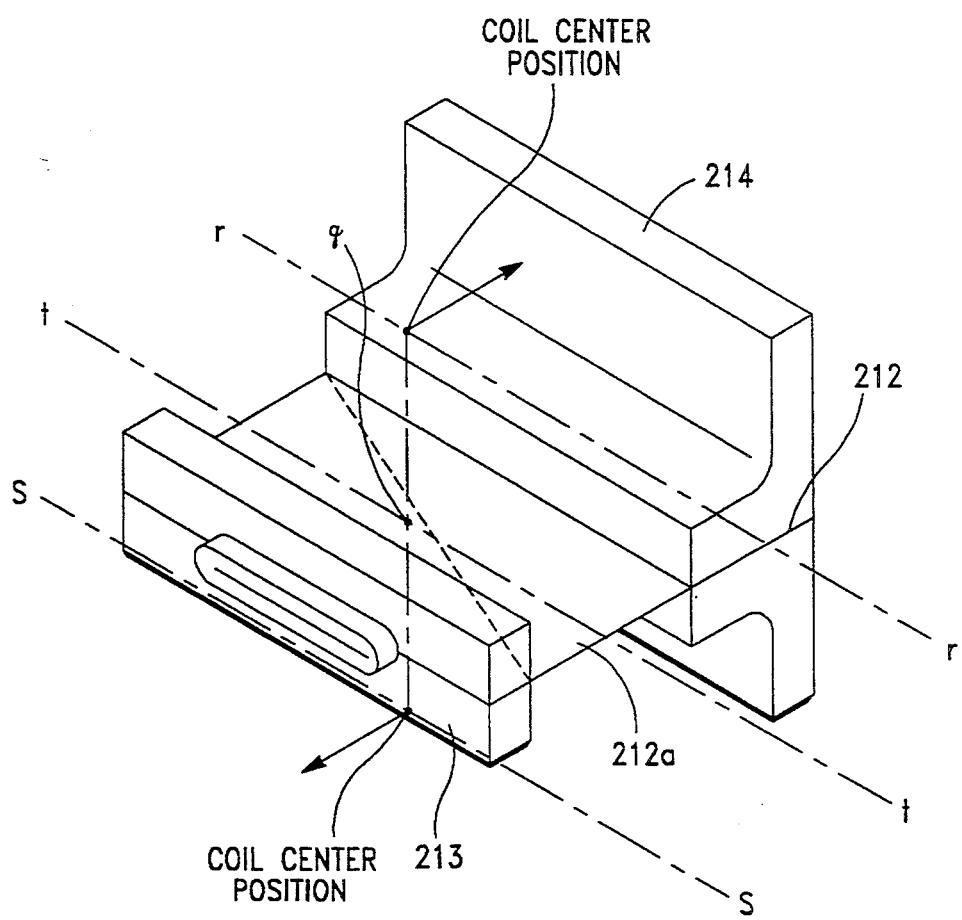
FIG. 8 shows the relationship between the location of the gravity center, the principal axis of inertia and the locations of the coils of the galvanomirror in the second embodiment of this invention.

As shown in FIG. 8, elastic deformation section 212a has a rectangular shape. The position of the gravity center of the moving section is at point q, which is the intersecting point of the diagonal lines on elastic deformation section 212a. For this type of gravity center alignment, balancer 220 may be attached to holder 211 as a counter weight. Alternatively, the shape of holder 211 may be changed so that it is balanced, in which case balancer 220 need not be used. The principal axis of inertia of the moving section nearly matches a center line t—t, which passes through center point q of elastic deformation section 212a. The gravity center alignment and the principal axis of inertia alignment become easy by making the shape of elastic deformation section 212a rectangular.

Yokes 218a and 218b are placed on one side of coils 216a and 216b, respectively. Magnets 217a and 217c are attached to yoke 218a at an appropriate distance from coil 216a. Similarly, magnets 217b and 217d are attached to yoke 218b at an appropriate distance from coil 216b. Coil 216a is placed in a position symmetrical to magnets 217a and 217c. Similarly, coil 216b is placed in a position symmetrical to magnets 217b and 217d. Thus, according to the Fleming left hand rule, the locations of the electromagnetic force generated in coils 216a and 216b, shown as drive center lines r—r and s—s in FIG. 8, pass through the center position of each of coils 216a and 216b. In addition, drive center lines r—r and s—s are nearly parallel to center line t—t that passes through center point q of elastic deformation section 212a.

In galvanomirror 232 as described above, the magnet circuitry formed by yokes 218a and 218b and magnets 217a, 217b, 217c and 217d creates a magnetic field. When current flows through coils 216a and 216b, electromagnetic force is generated in these coils according to the Fleming left hand rule. This electromagnetic force functions as the moment that rotates the moving section around center line t—t. Since point q, which is the rotation center point, matches the position of the gravity center of the moving section, the moment does not function as an extra force that attempts to cause the moving section in translational motion. It functions only as the moment around center line t—t. As a result, holder 211 rotates in a stable condition around point q by the elastic deformation of elastic deformation section 212a.

Figure 9:
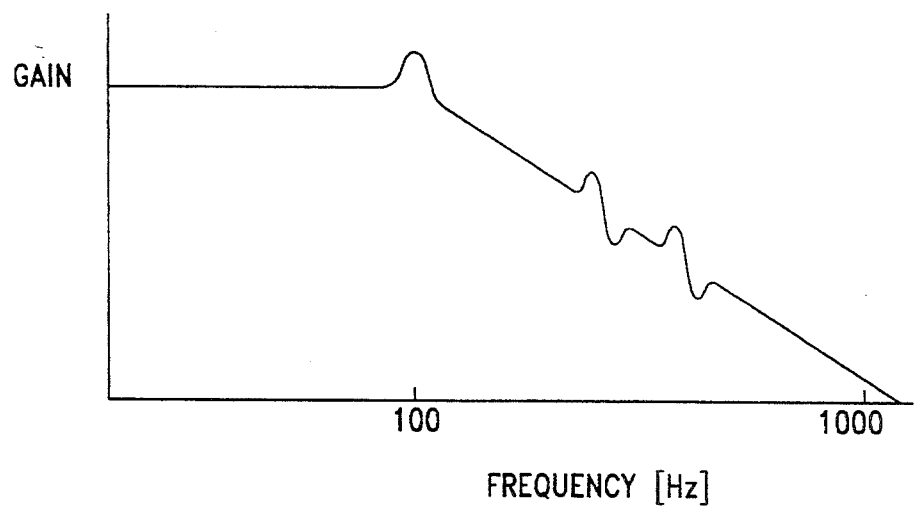
FIG. 9 shows the frequency characteristics of the galvanomirror in the first embodiment of this invention.
Figure 10:
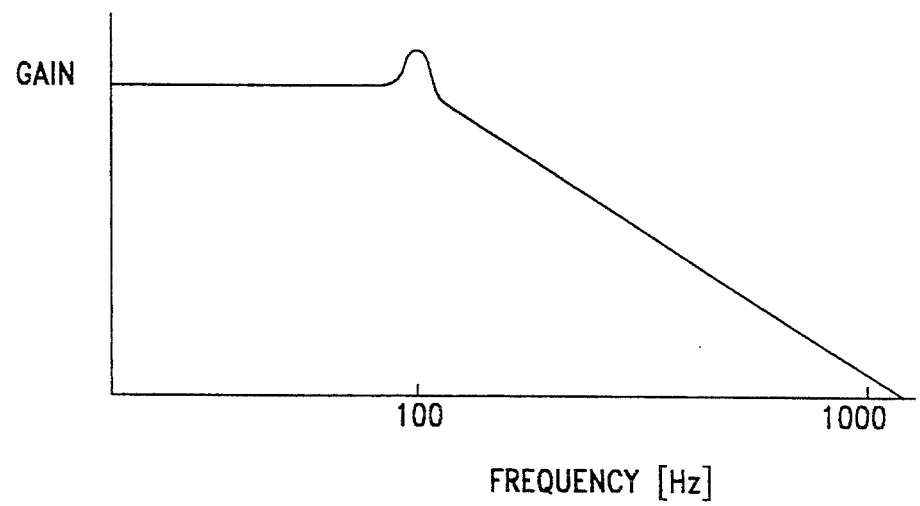
FIG. 10 shows the frequency characteristics of the galvanomirror in the second embodiment of this invention.

FIG. 9 shows the frequency characteristics of the galvanomirror associated with the first embodiment. FIG. 10 shows the frequency characteristics of the galvanomirror of this embodiment. It is clear that the harmful resonance is eliminated in FIG. 10. The harmful resonance is caused by the secondary resonance and the torque resonance of the flat metal spring, etc. As shown in FIG. 9, a resonance peak caused by the primary resonance of the flat metal spring occurs in the 100 Hz region. Furthermore, a resonance peak caused by the secondary resonance of the flat metal spring occurs in the 500 Hz region. In the region between the resonance peaks caused by the primary resonance and the secondary resonance is the resonance peak caused by the torque resonance of the flat metal spring. However, as shown in FIG. 10, the secondary resonance is minimized in this embodiment because point q, which is the rotation center of the moving section, is matched with the position of the gravity center of the moving section. The resonance peak caused by the torque resonance is also minimized because drive center lines r—r and s—s of coils 216a and 216b are parallel to the principal axis of inertia of the moving section. This embodiment has extremely good frequency characteristics in a broad frequency region from the low frequency region to the high frequency region. The frequency characteristics of FIGS. 9 and 10 each show the ratio of the rotation angle of the galvanomirror and the input current in the coils in decibels in the frequency region.

When controlling the galvanomirror through servo, primary resonance is not a particular problem. However, since secondary resonance causes oscillation in servo system, it is impossible to control the galvanomirror through servo in the frequency region where secondary resonance occurs. It is also impossible to have the operating frequency band within the servo control band. When a frequency of secondary resonance is in the servo band, it is necessary to use a notch filter in order to eliminate the resonance present. However, it is difficult to completely eliminate secondary resonance. Moreover, if the notch filter is used, it will make the galvanomirror drive circuitry more complex.

In this embodiment, elastic deformation section 212a is made of a flat metal spring. However, a plurality of flat metal springs may be used or a plurality of elastic deformation sections may be formed on one flat metal spring. In this case, the weight of the moving section should be distributed so that it balances the respective spring constants of the elastic deformation sections with the respective elastic deformation sections. Each individual weight component that is distributed should be put on the respective elastic deformation section.

Figure 11:
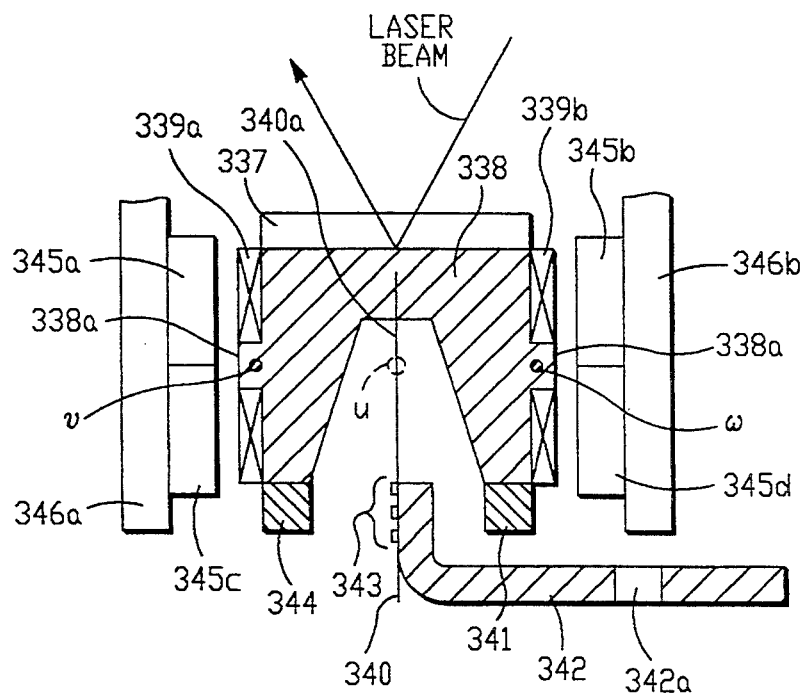
FIG. 11 shows a cross section of the main components in the third embodiment of this invention.

FIG. 11 shows the third embodiment of this invention. As shown in FIG. 11, a reflecting mirror 337 is attached to a holder 338 by an adhesive. The holder has a concave cross section and is formed as a single unit with a flat metal spring 340. Balancers 341 and 344 are attached to the other side of holder 338, opposite to reflecting mirror 337. On each side of holder 338 protrudes a convex section 338a. Coils 339a and 339b are attached to respective convex sections 338a. Yokes 346a and 346b are respectively placed on each side of holder 338. Magnets 345a, 345c and magnets 345b, 345d are respectively attached to yokes 346a and 346d at an appropriate distance from coils 339a and 339b.

A part of flat metal spring 340 is welded by laser to a base 342, which has an L-shaped cross section, to form a laser welded section 343. A hole 342a in base 342 is for attaching to and tightening down the galvanomirror on the main unit base (not shown). Flat metal spring 340 has an elastic deformation section 340a between holder 338 and base 342. In the longitudinal direction, the flat metal spring is rectangular in shape.

The moving section, which is composed of reflecting mirror 337, holder 338, balancers 341 and 344 and coils 339a and 339b, is balanced in weight so that the position of the gravity center is approximately at a point u of elastic deformation section 340a. The principal axis of inertia of the moving section, which is vertical to the paper and passes through point u in FIG. 11, is nearly parallel to the drive center lines of coils 339a and 339b, which pass through points v and w vertically in FIG. 11.

In the galvanomirror as described above, the magnetic circuitry, which is composed of yokes 346a and 346b and magnets 345a–345d, creates a magnetic field. When a current flows through coils 339, electromagnetic force is generated in the coils according to the Fleming left hand rule. This electromagnetic force functions as the moment around point u on flat metal spring 340. Holder 338 can thus rotate mainly around point u by the elastic deformation of elastic deformation section 340a. The incoming laser light will change angle and be reflected. When the galvanomirror is driven in the frequency region, the frequency characteristics will be like those shown in FIG. 10.

Figure 12:
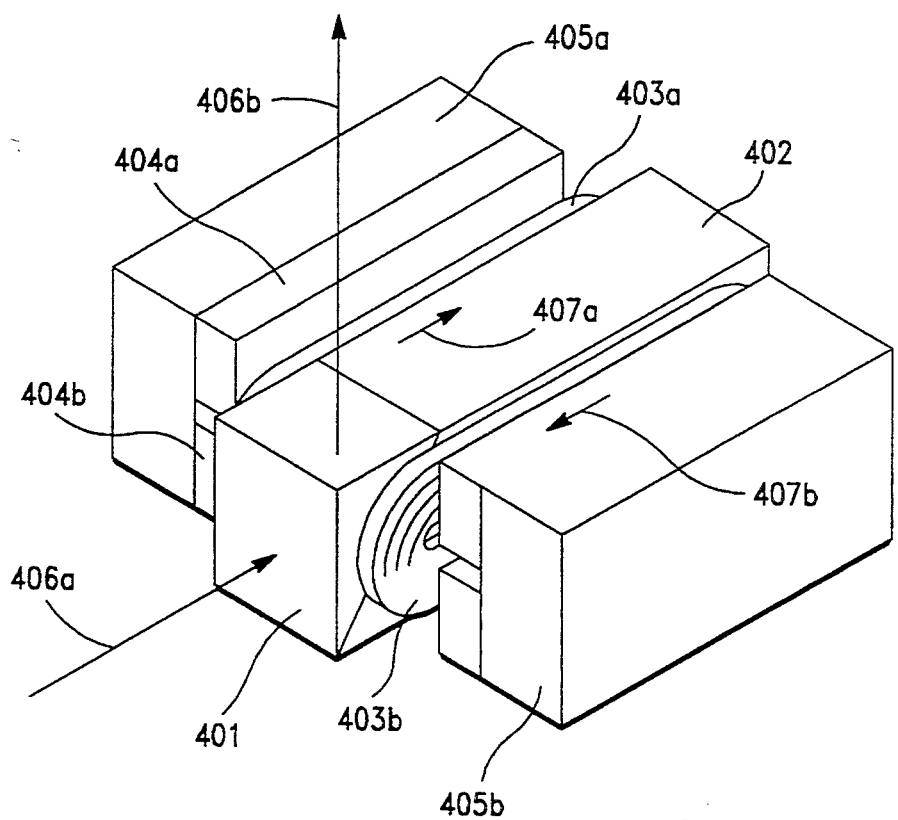
FIG. 12 shows the main configuration of the galvanomirror associated with the fourth embodiment of this invention.
Figure 13:
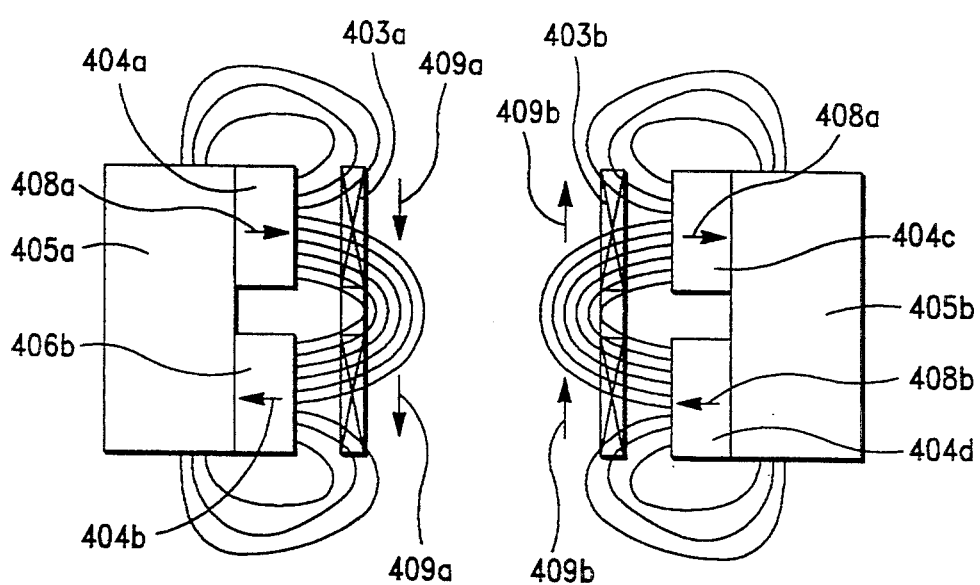
FIG. 13 shows the details of the magnetic circuitry of the fourth embodiment in FIG. 12.

The fourth embodiment of this invention is shown in FIGS. 12 and 13. FIG. 12 shows the major portion of the galvanomirror associated with this embodiment. FIG. 13 depicts an overview of the magnet circuitry. As shown in FIG. 12, a reflecting mirror 401 is attached to a holder 402. On each side of holder 402, respective elliptical coils 403a and 403b are attached. A laser light 406a changes direction at reflecting mirror 401 to become a laser light 406b. Two magnetic circuits are placed on respective sides of the moving section with an air gap in between. The moving section is composed of reflecting mirror 401, holder 402 and coils 403a and 403b. In each magnetic circuit, there are two magnets 404, the polarity directions of which are opposite to each other. A yoke 405a is placed at one side of coil 403a. Magnets 404a and 404b are attached to yoke 405a symmetrically relative to coil 403a.

Here, a magnetic direction 408a of magnet 404a and a magnetic direction 408b of magnet 404b are opposite, as indicated by the arrows. As shown in FIG. 13, the magnetic flux generated from magnet 404a creates flux curves that cover coil 403a while moving toward magnet 404b, forming a magnetic field. In the same manner, a yoke 405b is located at one side of coil 403b. Magnets 404c and 404d are attached to yoke 405b symmetrically relative to coil 403b. Here, magnetic direction 408a of magnet 404c and magnetic direction 408b of magnet 404d are opposite, as indicated by the arrows. The magnetic flux generated from magnet 404d creates flux curves that cover coil 403b while moving toward magnet 404c, forming a magnetic field.

As a result, when current flows through coil 403a in the direction of arrow 407a and through coil 403b in the direction of arrow 407b, electromagnetic force is generated in coil 403a in the direction of arrow 409a and in coil 403b in the direction of arrow 409b. This force generates a torque centered on the axis parallel to the rotation center of the moving section. The torque rotates the moving section and allows precision tracking to take place.

Because the magnetic circuitry of this embodiment has magnets 404a, 404b, 404c and 404d, which are magnetically different relative to each coil, 403a and 403b, it is possible to generate electromagnetic force of the same strength relative to the two effective portions of each coil, 403a and 403b. For this reason, the ratio of the torque to the inertia moment of the coils is approximately twice as large as that of the magnetic circuitry in the prior art. As a result, it is possible to reduce the coil inefficiency, reduce the size of the coils, make the moving section lighter in weight, and reduce the size of the precision angular displacement mechanism. Since the electric power supplied to the coils can be reduced, energy saving is also achieved.

Moreover, there is a force from a component of the electromagnetic force generated in the effective portion of coil 403a relative to magnet 404a that is not the torque around the axis parallel to the rotation center of the moving section. There is also a force from a component of the electromagnetic force generated in the effective portion of coil 403b relative to magnet 404d that is not the torque around the axis parallel to the rotation center of the moving section. Because these forces are in opposite directions and because they are of the same magnitude, they cancel out each other. In addition, because the same results can be obtained with magnets 404c and 404b, the force that contributes to the translational motion of the moving section decreases. Thus, in general, the force that functions in the moving section is only the torque around the axis parallel to the rotation center of the moving section. This is better balanced than in the magnetic circuitry of the prior art and allows a sharp increase in the rotation performance of the moving section.

If the rotation center of the moving section and the center of the torque are matched up, the rotation motion performance of the moving section would increase even further. As for the positions of the magnets, the same effect would be obtained if the positions of magnet 404c and 404d are switched and if the positions of magnets 404a and 404b are switched. As for coils 403a and 403b, if an air core coil, which uses no bobbin, is used, the inertia moment would become even smaller. If a coil with a wound flat magnet wire is used, the coil space factor would increase, reducing the volume of the coil required to generate a torque of the same magnitude and at the same time reducing the inertia moment. This would lead to a reduction in the size and an energy savings of the precision angular displacement mechanism.

Figure 14:
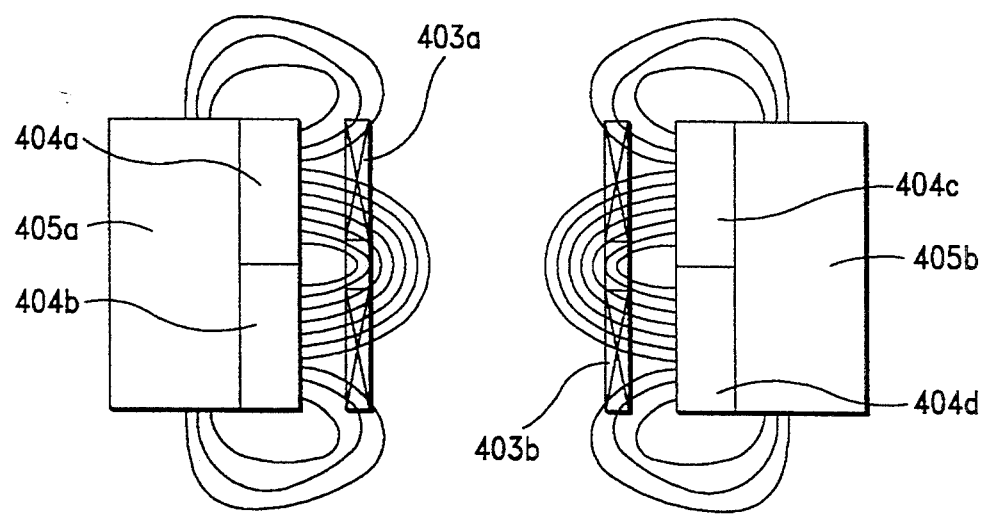
FIG. 14 shows the details of the magnetic circuitry of the fifth embodiment of this invention.

FIG. 14 shows the magnetic circuitry associated with the fifth embodiment of this invention. This embodiment is a variation of the fourth embodiment. In this embodiment, magnets 404a and 404b and magnets 404c and 404d are respectively securely attached together on yokes 405a and 405b respectively. In this way, the magnetic flux that passes through coils 403a and 403b increases even more compared to that of the fourth embodiment, generating a torque more efficiently.

Figure 15:
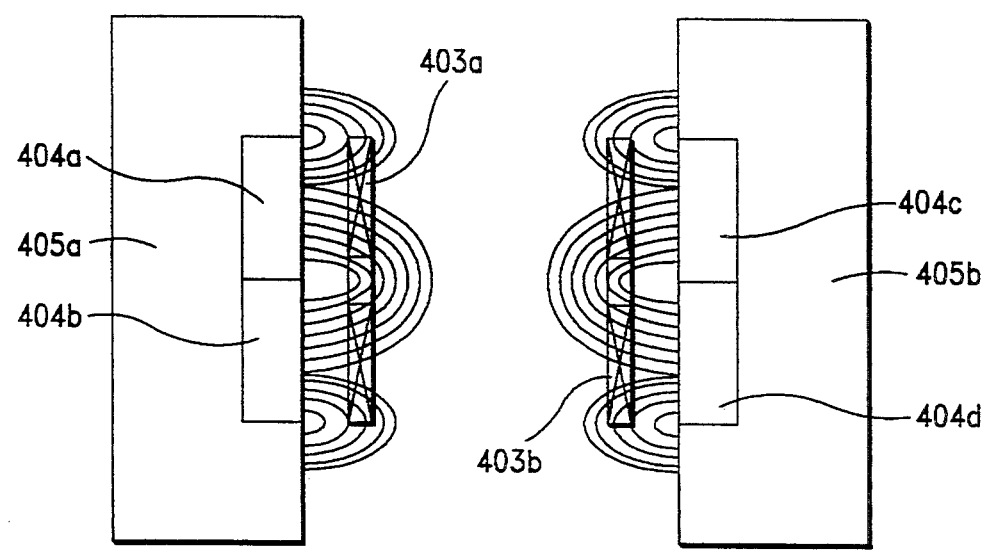
FIG. 15 shows the details of the magnetic circuitry of the sixth embodiment of this invention.

FIG. 15 shows the magnetic circuitry associated with the sixth embodiment of this invention. This embodiment is a variation of the fifth embodiment. In this embodiment, magnets 404a and 404b and magnets 404c and 404d each pair are placed inside a concave portion of yokes 405a and 405b and attached together without a gap. In this way, the magnetic flux that is close to the end surface areas of magnets 404a, 404b, 404c and 404d at yokes 405a and 405b is more at a right angle relative to coils 403a and 403b compared to the fourth and the fifth embodiments. This increases the torque component of the electromagnetic force generated, resulting in generating even more efficient torque. Moreover, when the surfaces of magnets 404a, 404b, 404c and 404d, and the surfaces of yokes 405a and 405b that face the coils 403a and 403b are matched up, torque can be generated with even greater efficiency.

FIG. 16 shows the magnetic circuitry associated with the seventh embodiment of this invention. This embodiment is also a variation of the fifth embodiment. In this embodiment, the individual magnets, 404e and 404f, both of which have magnetically opposing polarities, are attached to yokes 405a and 405b, respectively. In this way, the same effects as that in the fifth embodiment can be obtained. In addition, the number of parts required can be reduced, increasing the assembly efficiency.

Figure 17:
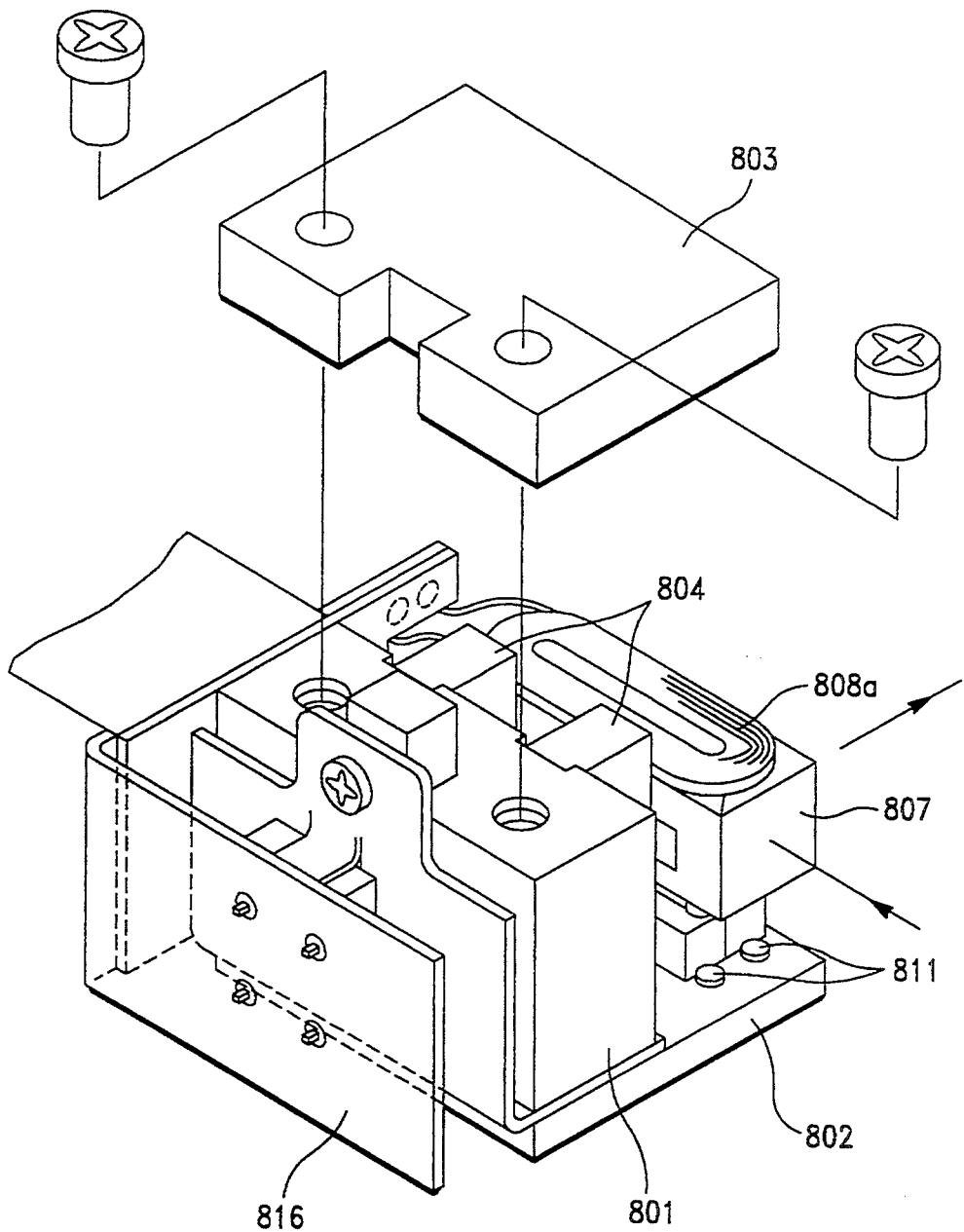
FIG. 17 is an angular view of the assembly of the galvanomirror associated with the eighth embodiment of this invention.
Figure 18:
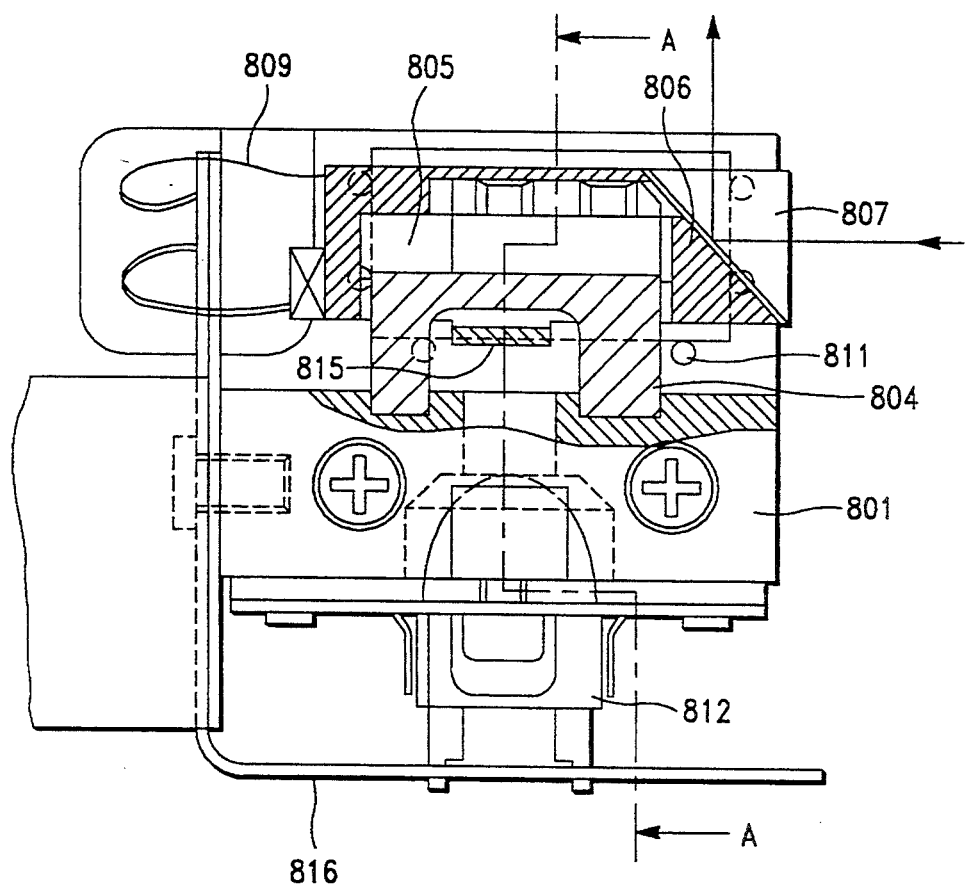
FIG. 18 is a cross section of part of the galvanomirror that is viewed from the side, which is associated with the eighth embodiment of this invention in FIG. 17.
Figure 19:
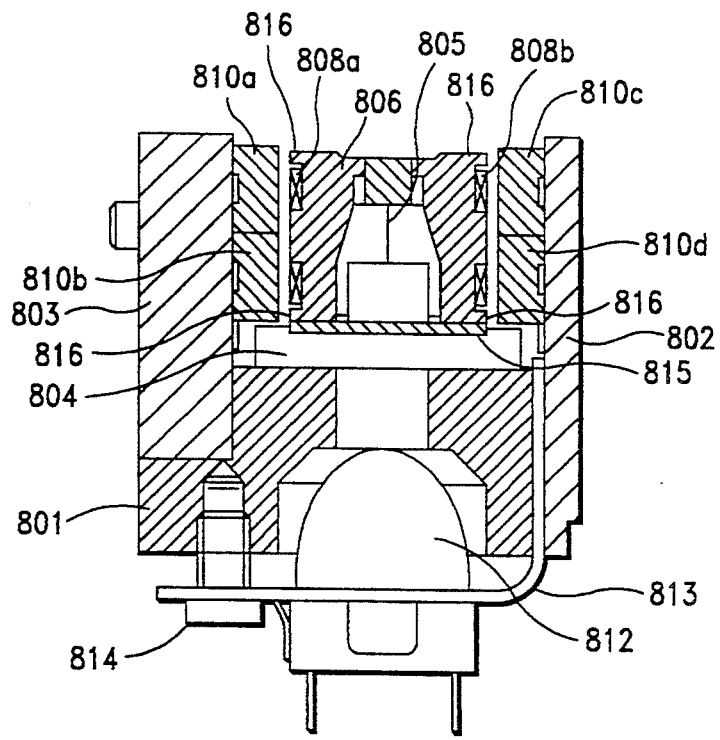
FIG. 19 is a cross section of the area represented by line A—A in FIG. 18.

FIGS. 17-19 show the eighth embodiment of this invention. FIG. 17 shows an angular view of the assembly of the galvanomirror of this embodiment. FIG. 18 shows a cross sectional portion of the galvanomirror of this embodiment viewed from one side. FIG. 19 shows the cross section of line A—A in FIG. 18. As shown in these drawings, yokes 802 and 803 are each placed on one side of a base 801. A support base 804 is located on the upper surface of base 801. A holder 806 is supported by a flat metal spring 805 on support base 804. On one end of holder 806 is a tapered surface to which a triangular column shaped reflecting mirror 807 is attached. On both surfaces of holder 806 are elliptical coils 808a and 808b. A laser light emitted from a light source (not illustrated) is sent to reflecting mirror 807, which allows the laser light to be output to the shifting optical system (not illustrated).

Coils 808a and 808b are connected to the power supply (not shown) through a lead wire 809. On yoke 803 are two magnets 810a and 810b that are opposite to coil 808a. On yoke 802 are two magnets 810c and 810d which are opposite to coil 808b. Each pair, magnets 810a and 810b and magnets 810c and 810d, face the coils with different polarities and are adjacent to each other without gaps. Also, magnets 810a and 810b and magnets 810c and 810d are positioned on yokes 802 and 803 using dowels 811 attached to yokes 802 and 803 so that coils 808a and 808b can be positioned accurately in a symmetrical position to each other.

By using dowels 811 in this manner to accurately position magnets 810a, 810b, 810c and 810d, it is possible to adjust accurately the drive center lines of coils 808a and 808b to the principal axis of inertia of the moving section. Stoppers 816 may also be provided on holder 806 to prevent the deformation of flat metal spring 805 and to avoid impact on coils 808a and 808b and magnets 810a, 810b 810c and 810d when a large amount of current passes through coils 808a and 808b. A reflecting mirror 815 is attached to the bottom surface of holder 806. Also, a tilt sensor 812 is located in a position opposite to the reflecting mirror. This tilt sensor 812 is inserted from the bottom into a hole that runs from the top to the bottom of base 801. The sensor is pushed into place on base 801 by a sensor spring 813.

The angular adjustment of flit sensor 812 can be achieved by using a sensor adjustment screw 814 to adjust the interval between sensor spring 813 and base 801. Tilt sensor 812 is composed of a light source and a reflected light volume detector. The reflected light volume detector detects the amount of light reflected at reflecting mirror 815. This makes it possible to detect the angle of holder 806 and reflecting mirror 815. A flexible printed circuit board 816 is connected to the tilt sensor by soldering. The amount of reflected light detected by tilt sensor 812 is input tea control circuit (not shown) and used for controlling the moving section. By using the tilt sensor in this manner, the offset that occurs during assembly can be prevented.

Figure 20:
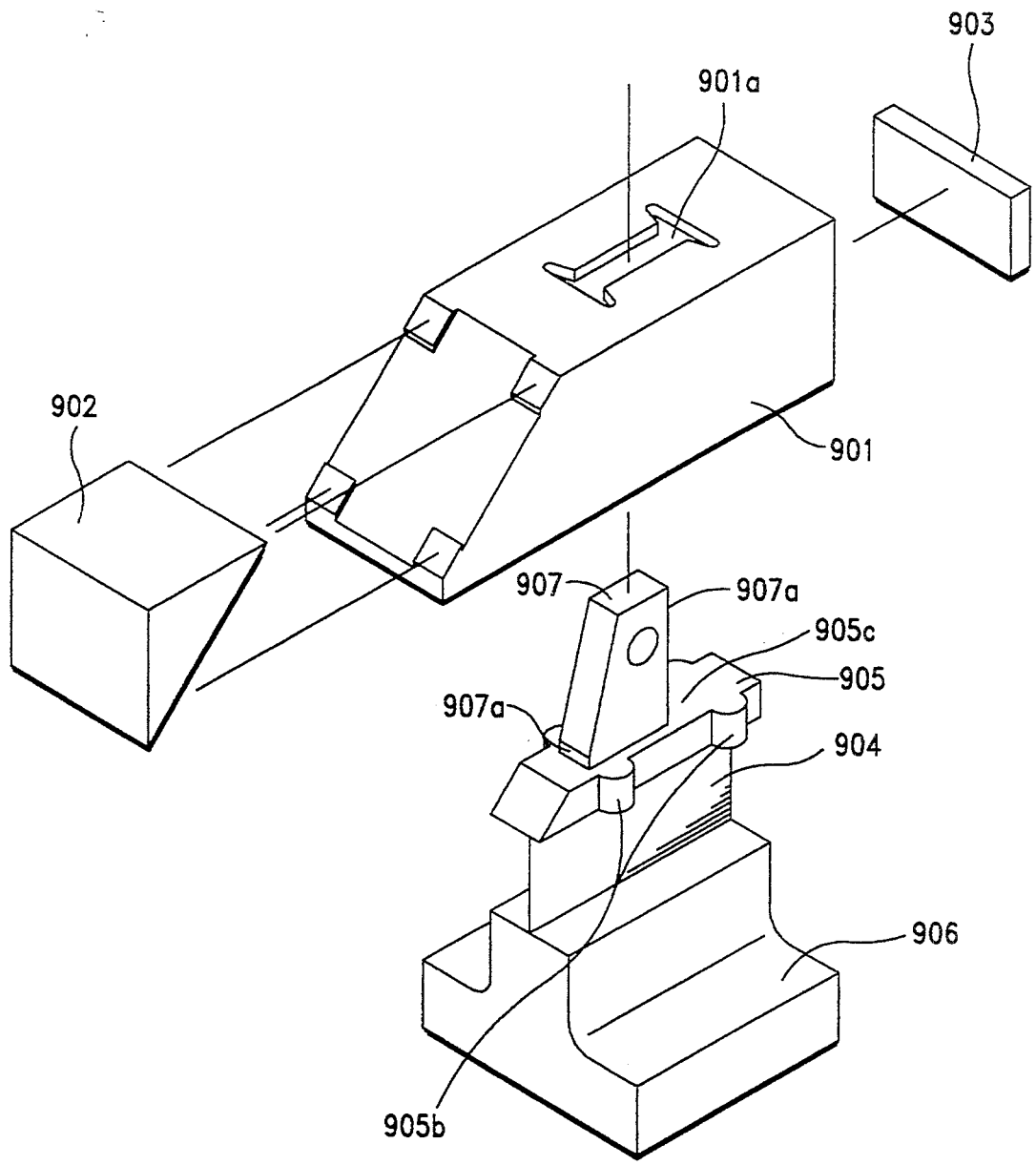
FIG. 20 shows an angular assembly view of the moving section of the galvanomirror in FIG. 17.
Figure 22:
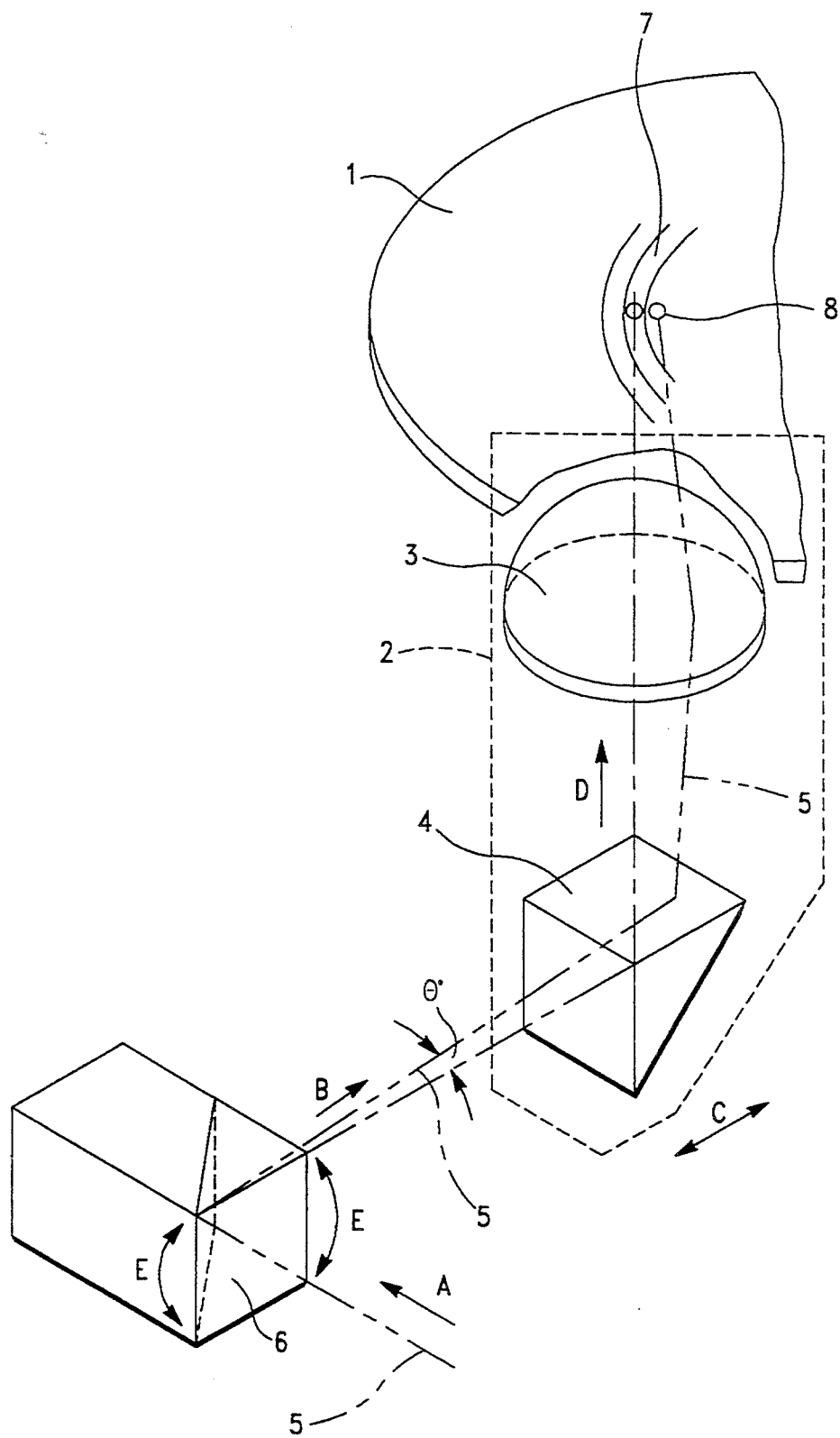
FIG. 22 is an angular view that shows the general features of the optical record and playback apparatus of the prior art.
Figure 23:
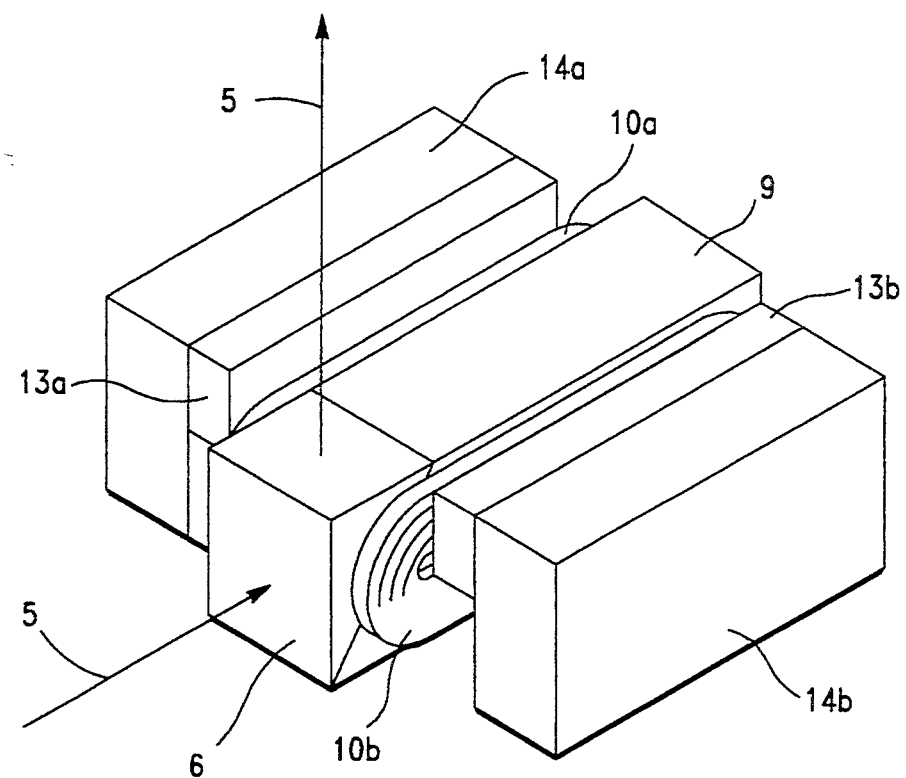
FIG. 23 is an angular view of the major components of the precision angular displacement mechanism of the prior art.
Figure 26:
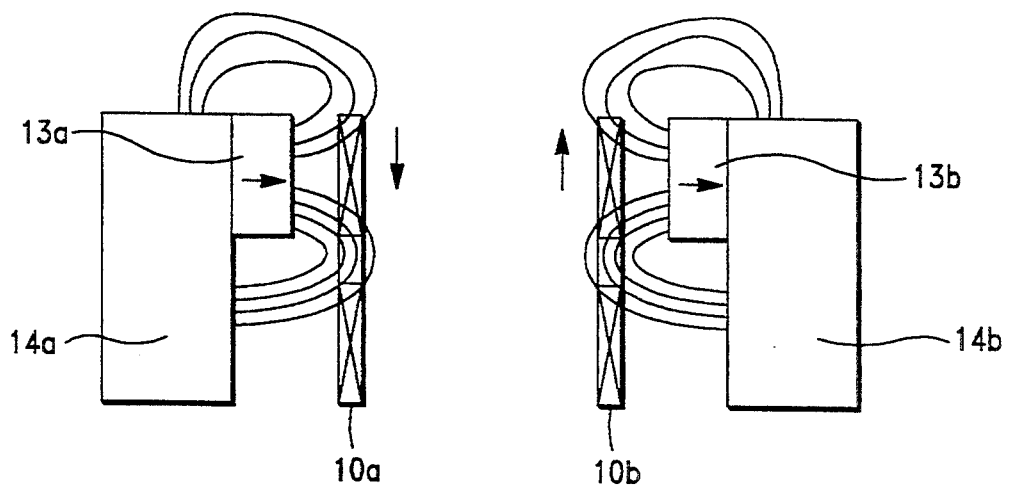
FIG. 26 shows the details of the magnetic circuitry of the embodiment in FIG. 23.
Figure 24:
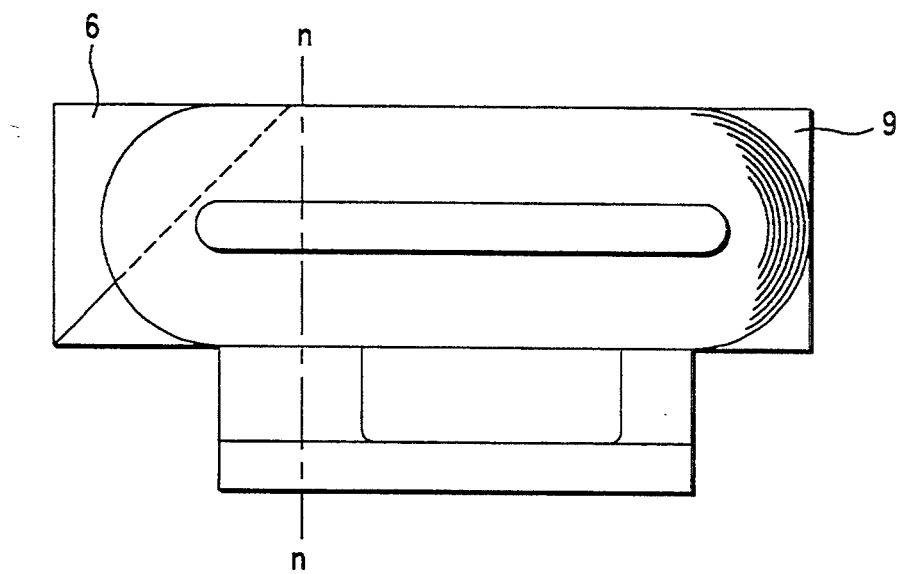
FIG. 24 shows a side view of the galvanomirror of the prior art.
Figure 25:
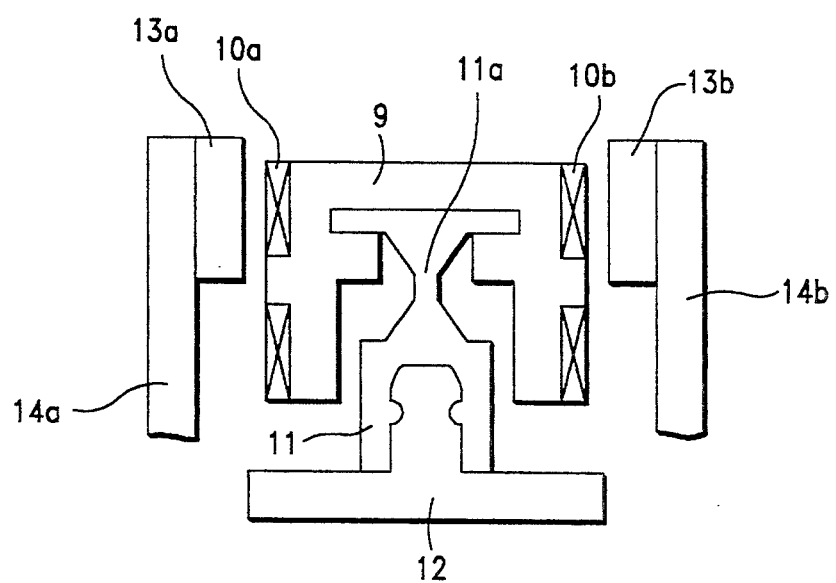
FIG. 25 shows a cross section of the area represented by line n—n of FIG. 24.
Figure 6:
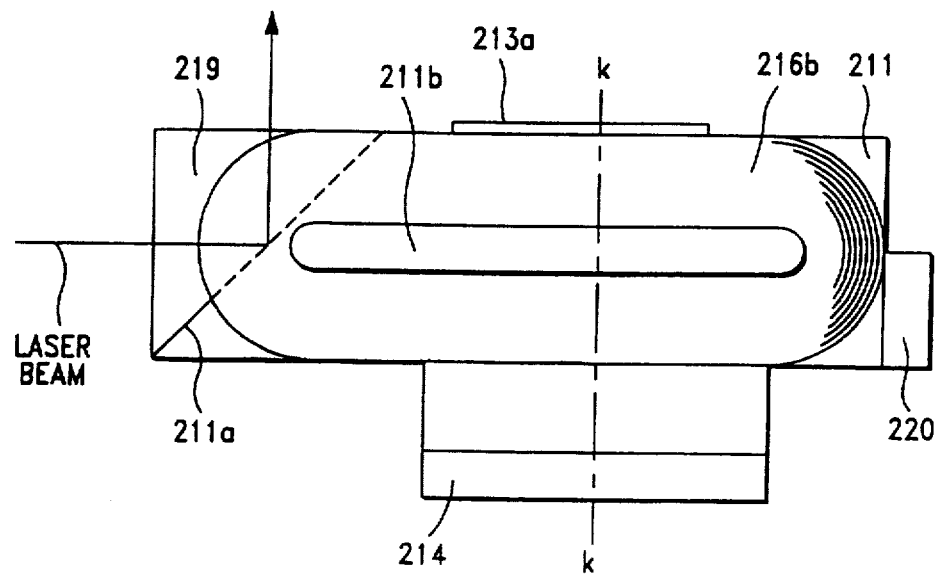
Figure 7:
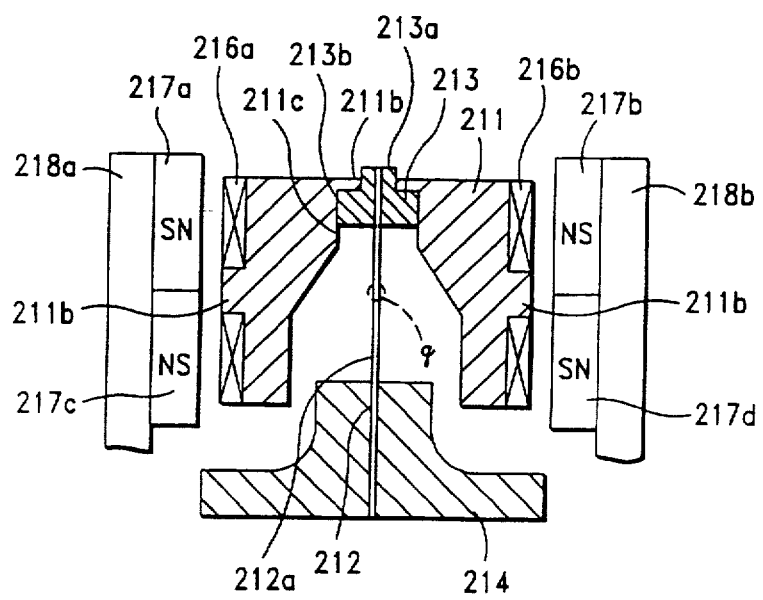
Figure 8:
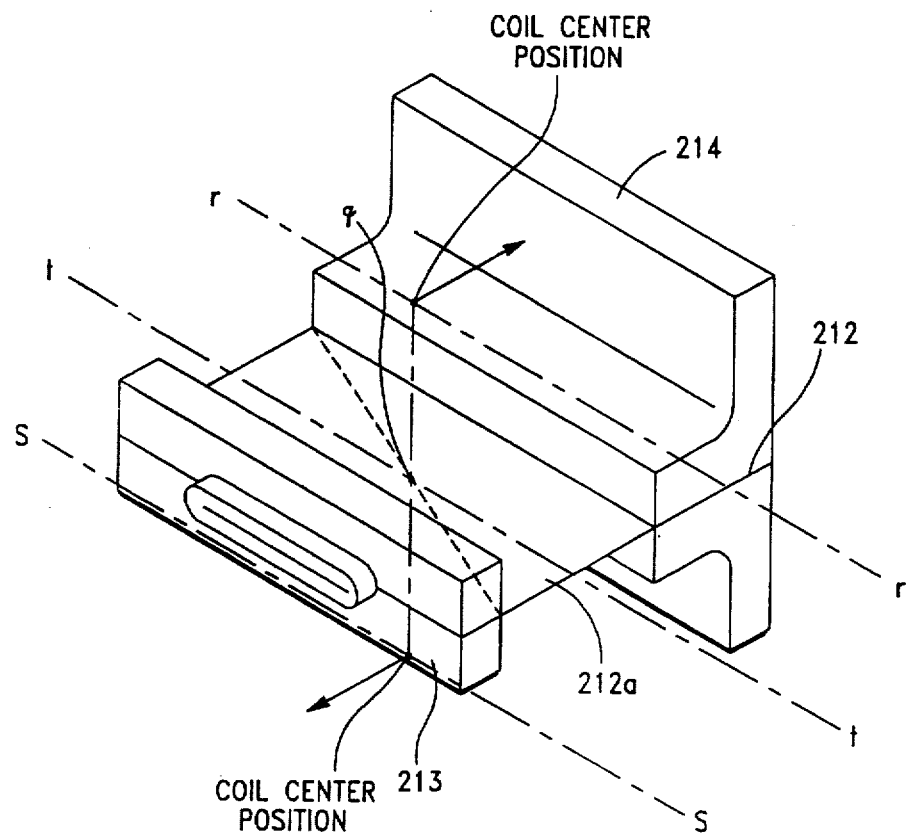
Figure 11:
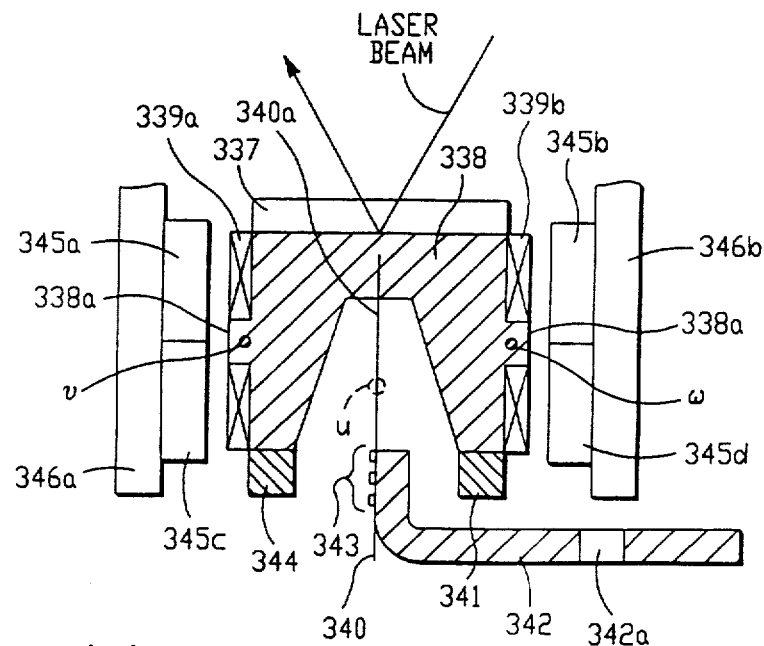
Figure 18:
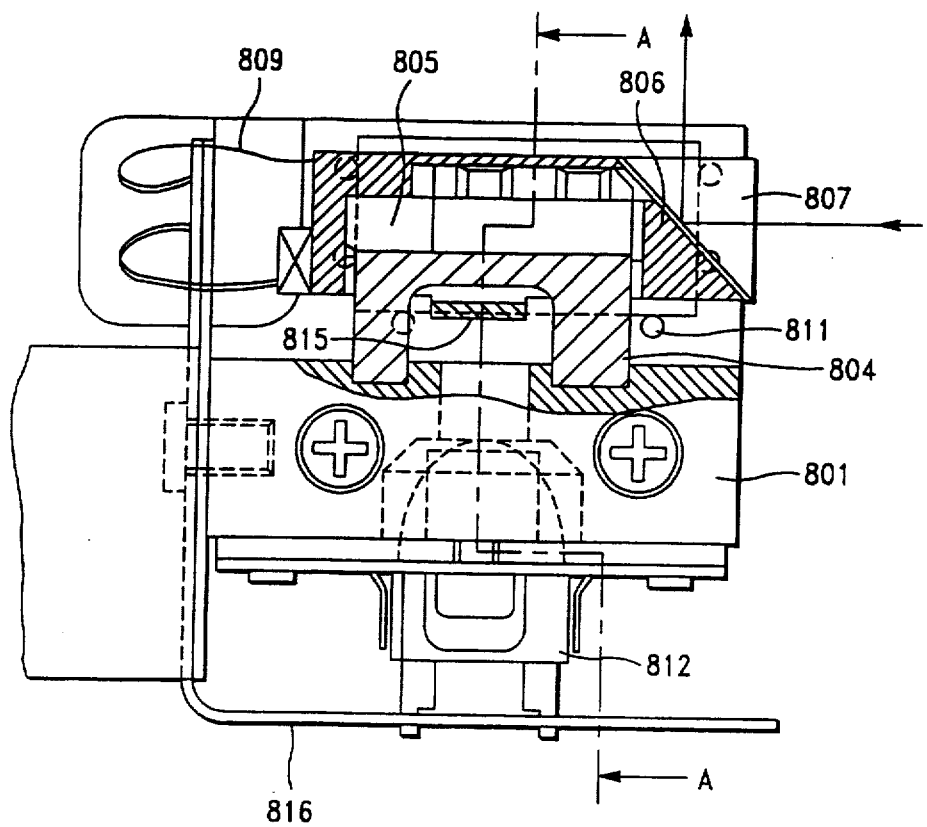
Figure 19:
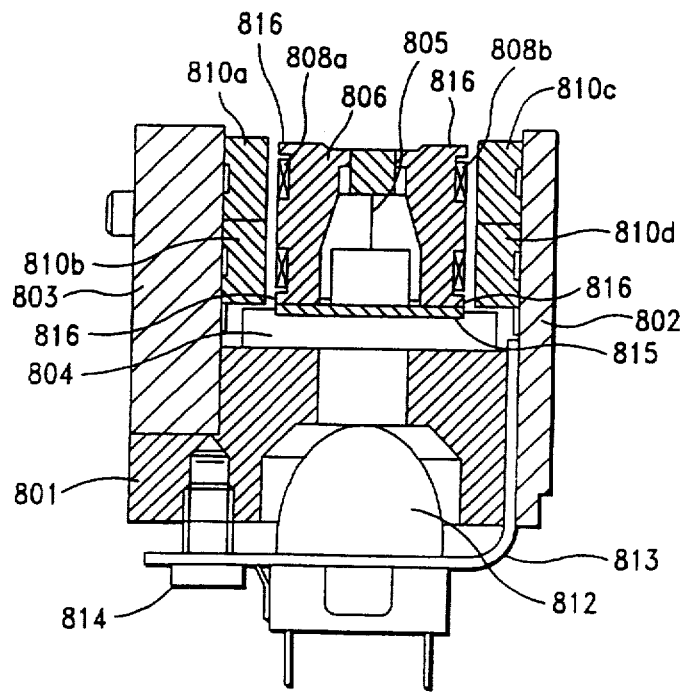

The method of assembling the moving section of the galvanomirror will be described with reference to FIGS. 20 and 21. As shown in FIG. 20, a terminal 905 and a support base 906 each are formed as a single unit on the tip end and the base end of a flat metal spring 904 respectively. As shown in FIG. 21, the section between terminal 905 and support base 906 of flat metal spring 904 is an elastic deformation section 904a. A projection 907 protrudes from a top surface 905c of terminal 905. Press-in sections 905b are formed on two sides of terminal 905 in direction Y. Projection 907 has a tapered shape in which the width becomes smaller near the tip. It has two reference surfaces 907a in direction X.

In addition, a holder 901 has a concave section into which terminal 905 fits. A reflecting mirror 902, which forms a triangular column, is attached at the tapered section at one end of the holder. Balancer 903 is attached to the opposite end. At the center of holder 901, a hole 901a is formed for inserting projection 907 of terminal 905.

As a result, by inserting projection 907 in hole 901a, direction X is designated by a reference surface 907a. Furthermore, by pushing press-in sections 905b of terminal 905 into the concave section of holder 901, direction Y is designated. The direction may also be designated by simply placing press-in sections 905b in contact with the holder and applying an adhesive. In addition, direction Z is designated by placing top surface 905c of terminal 905 in contact with holder 901.

Here, in order to prevent the deformation of flat metal spring 904 during assembly, terminal 905 may be fitted into holder 901 by raising projection 907 of terminal 905. After assembly, that part of projection 907 that protrudes from holder 901 will be cut off. This is particularly effective when the holder is very rigid.

As described above, the precision angular displacement mechanism of this invention is extremely effective as a tracking actuator of an optical record and playback apparatus with separated optical systems. It is especially effective as a tracking actuator that demands a high level of control characteristics, assembly capability and environmental characteristics. In addition, it may be used for galvanomirror applications involving scanning such as a laser printer.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as may fall within the spirit and scope of the appended claims.

What is claimed is:

1. An optical system for use with an optical disk, comprising:
    stationary optical system means including:
        a light source for supplying a laser beam, and
        angular displacement means including:
            a moving section comprising a reflecting mirror, responsive to the light source, for reflecting the laser beam, and a holder attached at its one end to the reflecting mirror,
            a flat metal spring attached at its tip to the holder for supporting the holder,
            a base on which the metal spring is mounted, and
            actuator means for rotating the moving section around a predetermined point on the flat metal spring so as to minutely tilt the reflecting mirror at precision angles for placing a laser light spot on a desired track of the optical disk; and
    shifting optical system means, radially movable relative to the optical disk and receiving the laser beam reflected from the reflecting mirror, for providing the reflected laser beam to the optical disk for carrying out record and playback operations.

2. The optical system of claim 1, wherein:
    the moving section further includes two coils each attached on one side surface of the holder;
    the actuator means includes two magnetic circuits each disposed at one side of the holder, each magnetic circuit comprising a yoke and two magnets attached to the yoke, with the two magnets being positioned at an air gap from a respective coil and positioned symmetrically relative to the center of the coils;
    wherein the two yokes of the two magnetic circuits are disposed parallel to each other;
    the two magnets of each magnetic circuit are arranged with their polarity directions being opposite to each other so as to increase the magnetic flux in a predetermined direction to increase an electromagnetic force generated by the coils when current flows through the coils; and
    wherein when current flows through the coils, an electromagnetic force is generated in the coils to cause the moving section to rotate.

3. The optical system of claim 2, wherein the two magnets of each magnetic circuits are attached together.

4. The optical system of claim 2, wherein each yoke has a concave section and the two magnets are attached to the concave section of the yoke.

5. The optical system of claim 2, further comprising a plurality of positioning dowels mounted on each yoke, the dowels being arranged in a U pattern in which the respective magnet is mounted on the respective yoke.

6. The optical system of claim 2, further comprising a plurality of stoppers attached on the holder and each facing a respective magnet for preventing a respective coil from contacting the respective magnet.

7. The optical system of claim 1, wherein:
the moving section further includes two coils each attached on one side surface of the holder;
the actuator means includes two magnetic circuits each disposed at one side of the holder, each magnetic circuit comprising a yoke and a single magnet attached to the yoke, with the magnet having two opposing polarities, the magnet being positioned at an air gap from a respective coil and positioned symmetrically relative to the center of the coils;
wherein the two yokes of the two magnetic circuits are disposed parallel to each other;
the magnet of each magnetic circuit is arranged so as to increase the magnetic flux in a predetermined direction to increase an electromagnetic force generated by the coils when current flows through the coils; and
wherein when current flows through the coils, an electromagnetic force is generated in the coils to cause the moving section to rotate.

8. The optical system of claim 1, wherein the plane which is formed by the laser beam going into the reflecting mirror and the laser beam coming out of the reflecting mirror is approximately the same as the plane on which the metal spring is located.

9. The optical system of claim 1, wherein said flat metal spring includes terminals attached at its tip for positioning and fixing said metal spring to said holder.

10. The optical system of claim 1, wherein the location of the center of gravity of the moving section nearly matches the center position of a section of the flat metal spring that is elastically deformable.

11. The optical system of claim 10, wherein a drive center line of the actuator means is nearly parallel to a principal axis of inertia of the moving section.

12. The optical system of claim 2 or claim 11, wherein the section of the flat metal spring that is elastically deformable is nearly square in shape.

13. The optical system of claim 1, wherein:
the tip of the flat metal spring is insert molded to the holder.

14. The optical system of claim 1, wherein the base is made of resin and the flat metal spring is insert molded to the base.

15. The optical system of claim 1, wherein the flat metal spring is attached to the base by laser welding.

* * * * *

UNITED STATES PATENT AND TRADEMARK OFFICE
CERTIFICATE OF CORRECTION

PATENT NO. : 5,446,712
DATED : August 29, 1995
INVENTOR(S) : Yamada, et. al.

It is certified that error appears in the above-identified patent and that said Letters Patent is hereby corrected as shown below:

Drawings:

Delete Figs. 6, 7, 8, 11, 18 and 19 and substitute therefor the Figs. 6, 7, 8, 11, 18 and 19 as shown on the attached pages.

Column 16, line 21, change "claim 2" to -- claim 10--.

Signed and Sealed this

Twenty-eighth Day of May, 1996

*Attest:*

BRUCE LEHMAN

*Attesting Officer*     *Commissioner of Patents and Trademarks*